US008868988B2

(12) United States Patent
Sun et al.

(10) Patent No.: US 8,868,988 B2
(45) Date of Patent: Oct. 21, 2014

(54) RATE MATCHING METHOD AND DEVICE

(75) Inventors: Zhili Sun, Guangdong (CN); Jun Xu, Guangdong (CN); Jin Xu, Guangdong (CN); Zhifeng Yuan, Guangdong (CN); Qianzi Xu, Guangdong (CN); Xianwei Gong, Guangdong (CN); Bo Sun, Guangdong (CN); Huiying Fang, Guangdong (CN)

(73) Assignee: ZTE Corporation, Shenzhen (CN)

( * ) Notice: Subject to any disclaimer, the term of this patent is extended or adjusted under 35 U.S.C. 154(b) by 280 days.

(21) Appl. No.: 13/260,045

(22) PCT Filed: Nov. 16, 2009

(86) PCT No.: PCT/CN2009/074969
§ 371 (c)(1),
(2), (4) Date: Jan. 17, 2012

(87) PCT Pub. No.: WO2010/118606
PCT Pub. Date: Oct. 21, 2010

(65) Prior Publication Data
US 2012/0110406 A1 May 3, 2012

(30) Foreign Application Priority Data

Apr. 14, 2009 (CN) .......................... 2009 1 0134725

(51) Int. Cl.
*G06F 11/00* (2006.01)
(52) U.S. Cl.
USPC ............................. 714/701; 714/748; 714/758
(58) Field of Classification Search
CPC ..................... H04L 1/0071; H04L 1/0041
USPC ......... 714/701, 748, 751, 755, 758, 759, 770, 714/776, 779
See application file for complete search history.

(56) References Cited

U.S. PATENT DOCUMENTS

| 7,823,040 B2* | 10/2010 | Cheng .......................... 714/751 |
| 2009/0041110 A1 | 2/2009 | Malladi |
| 2009/0086849 A1 | 4/2009 | Tsai et al. |
| 2009/0089491 A1* | 4/2009 | Hatanaka et al. ............. 711/103 |
| 2010/0195662 A1 | 8/2010 | Kang et al. |

FOREIGN PATENT DOCUMENTS

| CN | 101330351 A | 12/2008 |
| WO | WO 2008/153353 A1 | 12/2008 |
| WO | WO 2008/154646 A2 | 12/2008 |

OTHER PUBLICATIONS

International Search Report dated Mar. 4, 2010 for PCT/CN2009/074969, filed Nov. 16, 2009.
International Preliminary Report on Patentability and Written Opinion dated Oct. 18, 2011 for PCT/CN2009/074969, filed Nov. 16, 2009.
Extended European Search Report dated Aug. 12, 2013 in European Application No. EP 09843240.4 in 6 pages.

* cited by examiner

*Primary Examiner* — Fritz Alphonse
(74) *Attorney, Agent, or Firm* — Knobbe, Martens, Olson & Bear, LLP

(57) ABSTRACT

The present invention discloses a rate matching method and device. The method includes that: an information bit sequence is coded and interleaved to obtain a mother code codeword with a length $N_{FB\_Buffer}$; and bits are selected from the mother code codeword to generate a hybrid automatic repeat request (HARQ) subpacket for current transmission. By means of the present invention, the effect of covering the whole mother code area can be achieved as much as possible, and the performance of the HARQ multiple retransmission link can be enhanced.

19 Claims, 15 Drawing Sheets

RATE MATCHING METHOD AND DEVICE

CROSS REFERENCE TO RELATED APPLICATIONS

This application is the U.S. National Phase application under 35 U.S.C. §371 of International Application PCT/CN2009/074969 filed Nov. 16, 2009, which claims priority to Chinese Application 200910134725.9 filed Apr. 14, 2009.

FIELD OF THE INVENTION

The present invention relates to the communication field, and more particularly, to a rate matching method and device.

BACKGROUND OF THE INVENTION

A digital communication system is a common communication system. FIG. 1 is a structural block diagram of a digital communication system according to the related art. As shown in FIG. 1, the digital communication system is generally composed of a transmitting side, a channel and a receiving side, wherein the transmitting side generally includes a source, a source encoder, a channel encoder and a modulator and etc., the receiving side generally includes a demodulator, a channel decoder, a source decoder and a sink, a channel (or a storage media) exists between the transmitting side and the receiving side, and a noise source exists in the channel.

In the digital communication system, a channel coding link (including channel coding/decoding, modulating/demodulating and etc.) is the most important technology of the whole digital communication physical layer, which determines the effectiveness and reliability of bottom layer transmission of the digital communication system.

The functions of channel coding/decoding and modulating/demodulating parts in the channel coding link will be described in detail hereinafter.

The object of channel coding is to resist various noises and interferences in a transmission process. In general, by increasing redundant information artificially, the system can be enabled to obtain the capability of automatic error correction, so as to guarantee the reliability of the digital transmission. A Turbo code is one of currently-known optimal forward error correction codes, which is widely-used as a channel coding solution in data service transmission in numerous standard protocols. Moreover, with the increase of number of decoding iterations, the decoding error correction capability of the Turbo code will be continuously improved. The commonly-used Turbo code includes a binary Turbo code and a double-binary tail-biting Turbo code.

The process of rate matching is an important technology after the channel coding, the object of which is to repeat or puncture under the control of an algorithm the codeword bits after the channel coding, so as to guarantee that the data bit length after the rate matching matches the allocated physical channel resource. At present, there are mainly the following two rate matching algorithms: the $3^{rd}$ generation partnership project (3GPP) R6 rate matching algorithm and circular buffer rate matching (CBRM for short) algorithm.

In the above, the circular buffer rate matching algorithm is a simple algorithm, and the performance of the generated puncturing pattern is excellent. Such a rate matching algorithm is used in most communication systems such as the 3GPP2 standard series, the IEEE802.16e standard and the 3GPP long-term evolution (LTE for short).

In the circular buffer rate matching algorithm, in the case that the code rate is 1/3, the codeword bits output by the Turbo coding are separated to obtain three data bit streams by bit separation, which includes a system bit stream, a first check bit stream and a second check bit stream. The above three data bit streams are respectively rearranged by a block interleaver, the processing procedure of which is usually referred to as intra-block interleaving. Afterwards, in an output buffer, the rearranged system bit stream is placed at the start position, and then the two rearranged check bit streams are interleavingly arranged, the processing procedure of which is usually referred to as inter-block interleaving.

In addition, in the processing procedure of the intra-block interleaving, $N_{data}$ coding bits can be selected as the output of the circular buffer rate matching according to an expected output code rate, and in the circular buffer rate matching, the $N_{data}$ coding bits are read from a certain designated start position in the output buffer, the process of which is referred to as bit selection. To sum up, the bits which are selected to be used for transmission can be read from any position in the buffer. After the last bit in the circular buffer is read, the next bit data thereto is the data of the first bit position in the circular buffer. Therefore, the rate matching (puncturing or repeating) based on the circular buffer can be realized by a simple method. For an operation of the hybrid automatic repeat request (HARQ for short) which will be described hereinafter, the circular buffer has further the advantage of flexibility and granularity.

The HARQ is an important link adaptation technology in the digital communication system. The function of the technology is that: a receiver decodes the received HARQ data packet, wherein if the decoding is correct, an ACK signal is fed back to a transmitting side to inform the transmitting side to send a new HARQ data packet; and if the decoding is failed, a NACK signal is feedback to the transmitting side to request the transmitting side to retransmit the HARQ data packet. The receiving side can improve the decoding success probability and realize the high reliability requirement in the link transmission, by performing the incremental redundancy (IR for short) or the chase combination decoding on multiply-repeated data packets.

In the HARQ mode, different position in the circular buffer can be designated as the start position for reading data for each transmission of HARQ data packet. According to the definition of redundancy version (RV for short), multiple start positions for reading data in the circular buffer for the HARQ data packet are determined, and according to the value of the redundancy version, the specific start position for reading data in the circular buffer in the present HARQ data packet transmission is determined.

For example, in the LTE, a redundancy version (RV) defines a start point in a circular buffer for selecting a segment of codeword to generate a current HARQ packet. If the number of the RV is 4, the redundancy version marks four positions equally in the circular buffer in a sequence from left to right by use of 0, 1, 2 and 3. The more detailed description can be obtained by reference to the proposals and standards of virtual circular buffer rate matching of the LTE, which will not be described in detail any more.

The HARQ subpacket identifier (SPID for short) is currently applied in the IEEE802.16e standard, and the function of the SPID is essentially the same as that of the redundancy version (RV). Both of them can be used for determining the specific position of subpacket data in the circular buffer.

In an IEEE802.16e system, the HARQ subpacket identifier and an HARQ data packet length collectively define the start position and the length of the HARQ subpacket data in the circular buffer, so as to select a segment of codeword in the circular buffer to generate the current HARQ subpacket.

In the above, the value range of the SPID is {00, 01, 10, 11}. The value of the SPID transmitted for the first time must be 00, and the values of the SPIDs in other retransmissions (i.e. it is not the first transmission) can be arbitrarily selected or selected in a certain order in the above SPID value range. That is to say, in multiple transmissions, a certain SPID value may be used repeatedly or may not be used.

In the HARQ mechanism, multiple HARQ subpackets can be generated based on the same mother code data. When two or more HARQ subpackets read the bit in the same position of the mother code data, the overlapping phenomenon may occur. To improve the system performance, such overlapping phenomenon should be avoided as much as possible, and the more mother code data should be covered.

FIG. 2 is a schematic diagram illustrating the rate matching process under the IEEE802.16e standard, 1/3 code rate, and coding by the convolutional Turbo code (CTC for short) according to the related art. As shown in FIG. 2, the process procedure of retransmission relates to the intra-block interleaving for S information bit, P1 check area and P2 check area. In this process procedure, four retransmissions are performed, i.e. four subpackets are transmitted, more particularly, the overlapping phenomenon occurs between the first subpacket (F1=0&L1) of the first retransmission and the second subpacket (F2&L2) of the second retransmission, and at the same time there exists the mother code codeword which is not be covered; and after the second retransmission is performed, the third subpacket (F3&L3) and the fourth subpacket (F4&L4) are transmitted.

In the adaptive HARQ transmission mode, the length and the value of modulation orders of each HARQ subpacket are both associated with the value of the number of subchannels of the HARQ subpacket. Since the number of the subchannels of the subpacket of each transmission may be varied due to the influence of multiple factors, the modulation orders and the length of HARQ subpacket of each transmission may both be varied.

FIG. 3 is a schematic diagram illustrating the process of the rate matching according to the related art. As shown in FIG. 3, there are $3N_{EP}$ bits codewords in the circular buffer. In This process procedure, four retransmissions are performed. This method is based on the idea of continuous transmission actually, whereas the second retransmission, the third retransmission and the fourth retransmission are continuous transmission from back to front. The non-adaptive HARQ can realize the continuous transmission, however for the adaptive HARQ, since the size of Lk is different from each other, the third retransmission and the fourth retransmission can not be continuous coincidentally. FIG. 4 is a schematic diagram illustrating the coverage situation in the process procedure of the rate matching according to the prior and related art. As shown in FIG. 4, when the code rates of the third retransmission and the fourth retransmission are very high (i.e., the Lk of the third and fourth retransmission is much shorter than the Lk of the second retransmission), the severe overlapping may exist.

It can be concluded that, in the adaptive HARQ retransmission mechanism, since the length and the value of the SPID of a subpacket are different, on the one hand, the severe overlapping phenomena may exist which results in that the data with the same content is transmitted repeatedly, and probably results in that the subpacket data has large-area overlapping particularly when the SPID value is repeated; and on the other hand, a certain data content can not be transmitted at all time, thereby seriously affecting the system performance.

For the problem that the probability of the overlapping phenomena occurred in the process of the rate matching is high in the related art, there is no effective solution provided so far.

SUMMARY OF THE INVENTION

The present invention is provided for the problem that the probability of the overlapping phenomena occurred in the process of the rate matching is high, thus, the main object of the present invention is to provide an improved rate matching solution to solver the above problem.

To achieve the above object, a rate matching method is provided according to one aspect of the present invention.

The rate matching method according to the present invention includes: coding and interleaving an information bit sequence to obtain a mother code codeword with a length $N_{FB\_Buffer}$; and selecting bits from the mother code codeword to generate a hybrid automatic repeat request (HARQ) subpacket for current transmission.

To achieve the above object, a rate matching device is provided according to another aspect of the present invention.

The rate matching device according to the present invention includes: an encoder, adapted to code the information bit sequence to generate a codeword with a length $N_{FB\_Buffer}$; an interleaver, adapted to interleave the codeword generated by the encoder to obtain an interleaved mother code codeword; a circular buffer, adapted to store the interleaved mother code codeword obtained by the interleaver; and a rate matcher, adapted to select bits from the mother code codeword to generate a HARQ subpacket of current transmission.

To achieve the above object, a rate matching device is provided according to another aspect of the present invention.

The rate matching device according to the present invention includes: an encoder, adapted to code the information bit sequence to generate a codeword with a length $N_{FB\_Buffer}$; a memory, adapted to store the codeword coded by the encoder and virtual circular buffer generated by an address generator; the address generator, adapted to generate corresponding address of each codeword bit of a HARQ subpacket for current transmission in the memory, interleave the codeword stored in the memory to generate the virtual circular buffer with the length $N_{FB\_Buffer}$, take the data of the virtual circular buffer as a mother code codeword, and continuously select from the mother code codeword the address corresponding to a codeword bit section for generating the HARQ subpacket; and a codeword bit reader, adapted to select codewords from the memory according to the address selected by the address generator to generate the HARQ subpacket for current transmission.

By the present invention, a solution for decreasing the overlapping phenomena by changing the manner of selecting bits in the mother code codeword is adopted, so as to solve the problem that the probability of the overlapping phenomena occurred in the process of the rate matching is high, achieve the effect of covering the overall mother code areas as much as possible, and further increase the performance of HARQ multiple retransmission link.

BRIEF DESCRIPTION OF THE DRAWINGS

The accompanying drawings described herein are used to provide a further understanding of the present invention, and constitute a portion of the present application. The schematic embodiments of the present invention and the explanations thereof are used to explain the present invention, and do not constitute limitations on the present invention. In the accompanying drawings.

DETAILED DESCRIPTION OF THE EMBODIMENTS

Function Overview

Figure 1:
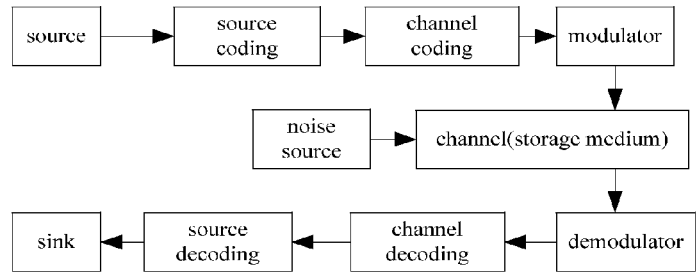
FIG. 1 is a structural block diagram of a digital communication system according to the related art.
Figure 2:
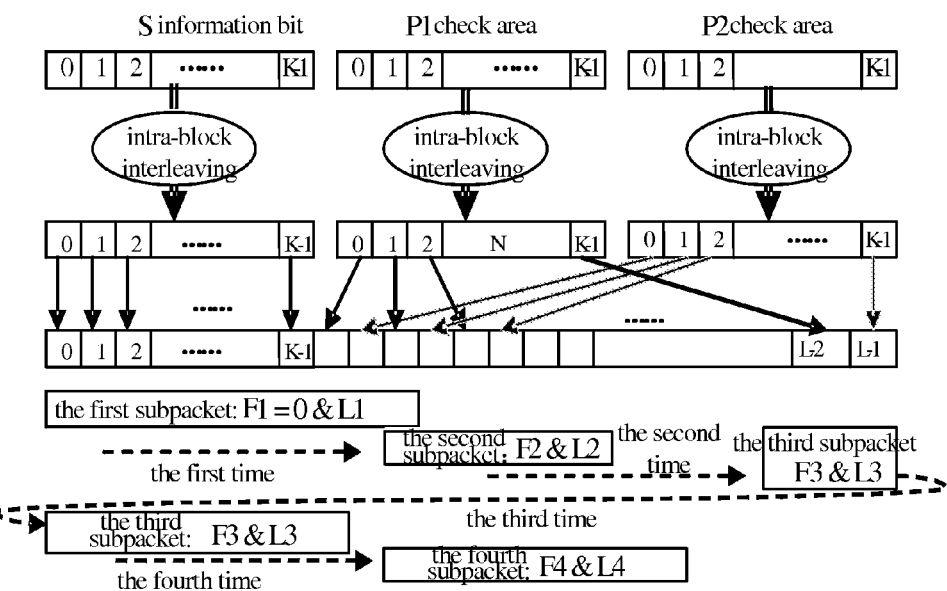
FIG. 2 is a schematic diagram of a rate matching procedure in the case of the IEEE802.16e standard, 1/3 code rate, and adopting the CTC coding according to the related art.
Figure 3:
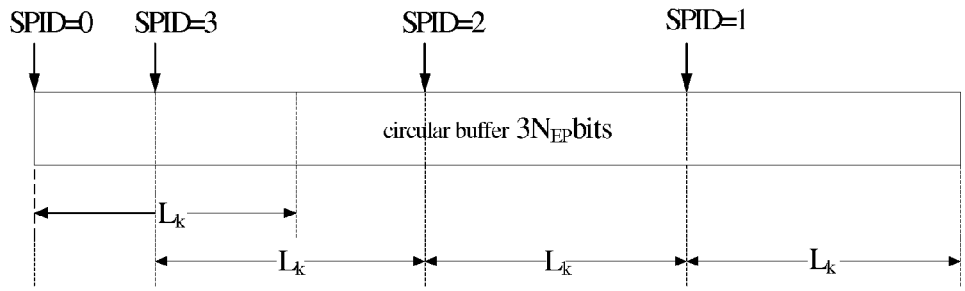
FIG. 3 is a schematic diagram of a rate matching process according to the related art.
Figure 4:
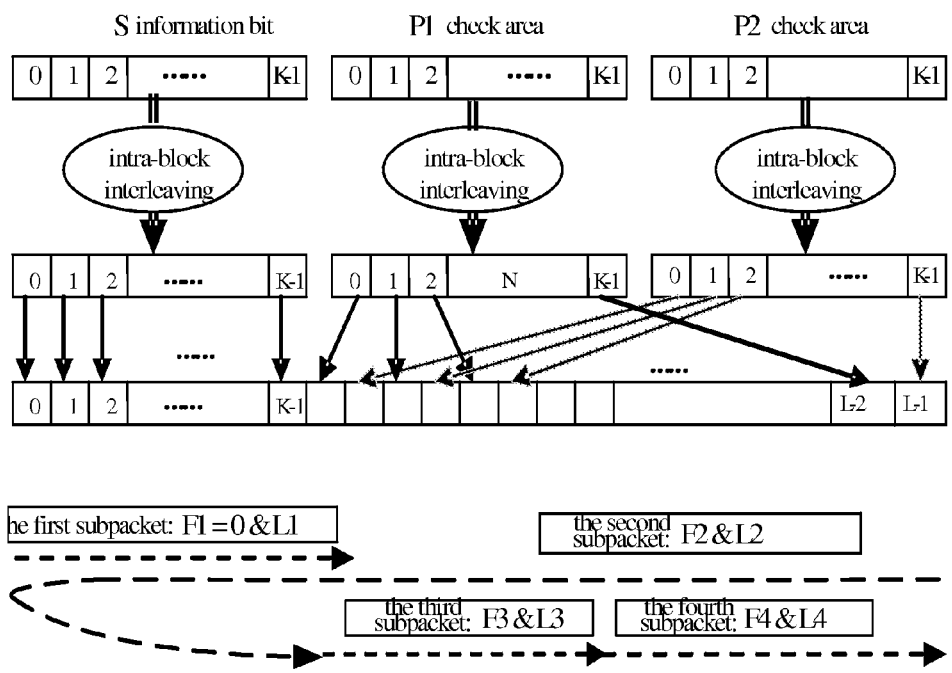
FIG. 4 is a schematic diagram of a coverage situation in a rate matching process procedure according to the related art.
Figure 5:
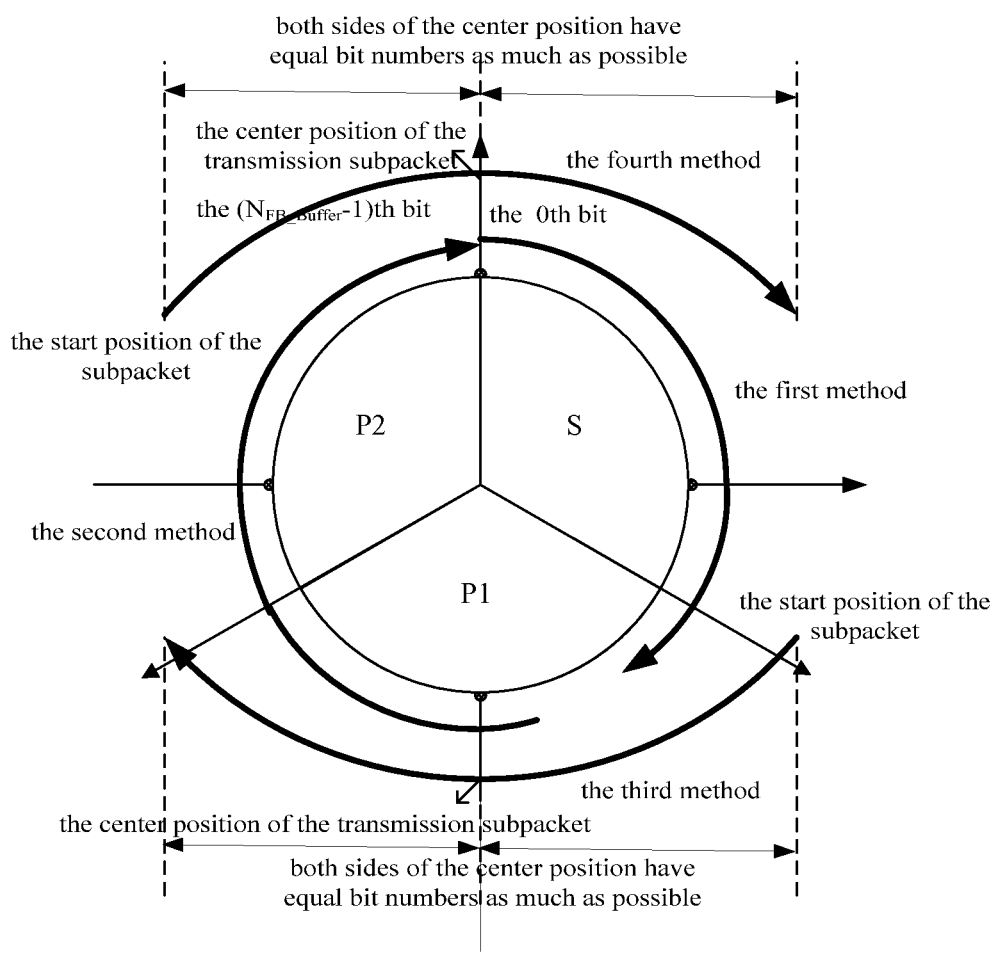
FIG. 5 is a circular schematic diagram of a process procedure of a rate matching method according to a method embodiment 1 of the present invention.
Figure 6:
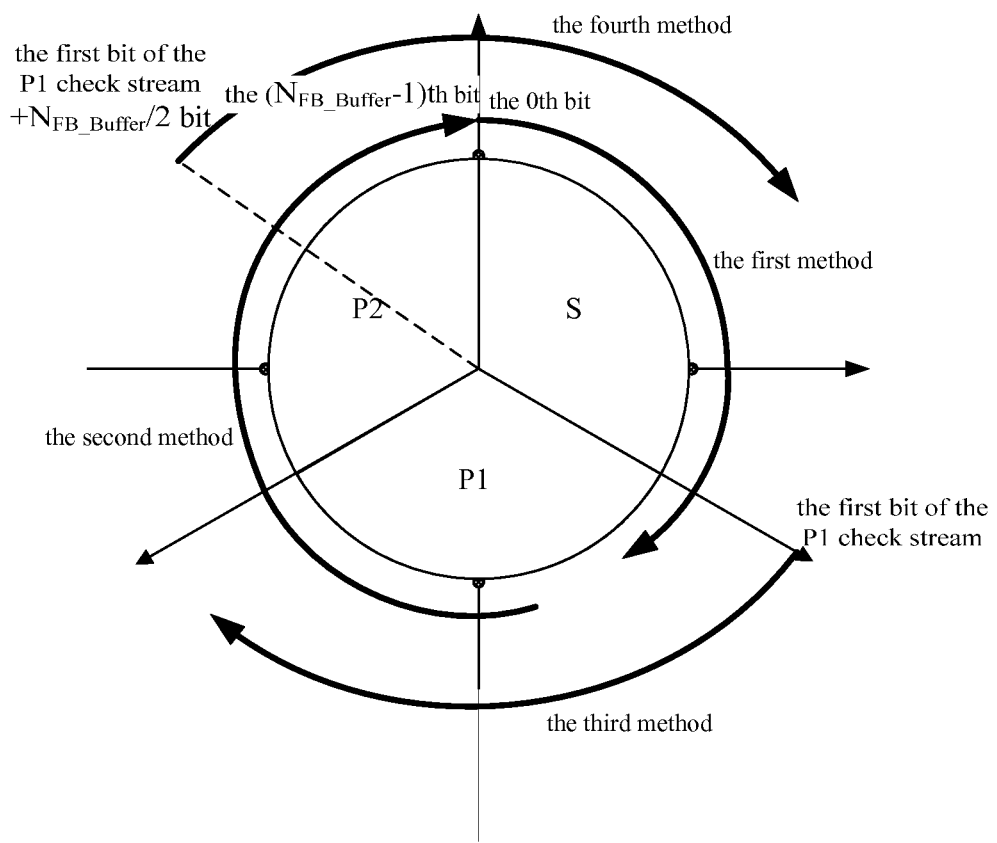
FIG. 6 is a circular schematic diagram of a process procedure of a rate matching method according to a method embodiment 2 of the present invention.

In view of the problem that the probability of the overlapping phenomena occurring in the process of the rate matching is high in the related art, a rate matching method is provided by embodiments of the present invention, which decreases the overlapping phenomena by changing the manner of selecting bits in the mother code codeword.

It should be noted that, in the case that there is no conflict, the embodiments and features thereof of the present application can be combined with each other. The present invention will be described in detail with reference to the accompanying drawings and in combination with the embodiments.

Method Embodiment 1

A rate matching method is provided according to an embodiment of the present invention. The method includes that: an information bit sequence is coded and interleaved to obtain a mother code codeword with a length $N_{FB\_Buffer}$, and bits are selected from the mother code codeword to generate a HARQ subpacket for current transmission, wherein the mother code codeword includes a system bit part and a check bit part. In the process of selecting bits from the mother code codeword to compose the HARQ subpacket, the start bit of the mother code codeword is regarded as the next bit of the last bit of the mother code codeword. It is supposed that a value range of a SPID of the HARQ subpacket retransmission is 0, 1, 2, 3.

Ten kinds of approaches for determining the start position of the HARQ subpacket are given hereinafter.

A first approach, the first L bits are selected starting from a predetermined start position in the mother code codeword with the length $N_{FB\_Buffer}$ to compose the HARQ subpacket, wherein the L is a predetermined length of the HARQ subpacket.

A second approach, the last L bits are selected from the mother code codeword with the length $N_{FB\_Buffer}$ to compose the HARQ subpacket, wherein the L is a predetermined length of the HARQ subpacket.

A third approach, L bits are selected by taking the middle position of the mother code codeword with the length $N_{FB\_Buffer}$ as the center position to compose the HARQ subpacket, wherein it is selected that both sides of the center position have approximately equal bit numbers as much as possible, and the L is a predetermined length of the HARQ subpacket.

A fourth approach, L bits are selected by taking the last bit position of the mother code codeword with the length $N_{FB\_Buffer}$ as the center position to compose the HARQ subpacket, wherein it is selected that both sides of the center position have approximately equal bit numbers as much as possible, and the L is a predetermined length of the HARQ subpacket.

A fifth approach, the first L bits are selected from the mother code codeword with the length $N_{FB\_Buffer}$ by taking the position of the first bit of a first check bit stream as the start position to compose the HARQ subpacket, wherein the L is a predetermined length of the HARQ subpacket.

A sixth approach, the first L bits are selected from the mother code codeword with the length $N_{FB\_Buffer}$ by taking the position obtained by adding the position of the first bit position of a first check bit stream and L/2 bit as the start position to compose the HARQ subpacket, wherein the L is a predetermined length of the HARQ subpacket.

A seventh approach, the first L bits are selected by taking the middle position of the mother code codeword as the start position to compose the HARQ subpacket, wherein the L is a predetermined length of the HARQ subpacket.

A eighth approach, L bits are selected by taking the middle position of the mother code codeword as the end position to compose the HARQ subpacket, wherein the L is a predetermined length of the HARQ subpacket.

A ninth approach, L bits are selected by taking the middle position between the last bit of the mother code codeword and the first bit of a first check bit stream as the end position to compose the HARQ subpacket, wherein the L is a predetermined length of the HARQ subpacket.

A tenth approach, L bits are selected by taking the position of the last bit of an information bit stream of the mother code codeword as the end position to compose the HARQ subpacket, wherein the L is a predetermined length of the HARQ subpacket.

When the value of the SPID is 0, 1, 2, or 3 (i.e. the first HARQ subpacket retransmission, the second HARQ subpacket retransmission, the third HARQ subpacket retransmission, or the fourth HARQ subpacket retransmission), any one of the above ten kinds of approaches for determining the start position of the HARQ subpacket can be adopted respectively according to the specific situation of the current HARQ subpacket.

In the above, the process of grouping the information and coding and interleaving the grouped information to obtain the system bit part and the check bit part can specifically include one of the following manners.

Manner 1, the grouped information is coded to obtain the system bit part and the uninterleaved check bit part, and the obtained system bit part is taken as a system bit part of the mother code codeword; the uninterleaved check bit part is intra-block interleaved to obtain the intra-block interleaved check bit part; and the intra-block interleaved check bit part is performed inter-block interleaved to obtain the inter-block interleaved check bit part, and the inter-block interleaved check bit part is taken as a check bit part of the mother code codeword.

Manner 2, the grouped information is coded to obtain an uninterleaved system bit part and an uninterleaved check bit part; the uninterleaved system bit part and the uninterleaved check bit part are intra-block interleaved to obtain the intra-block interleaved system bit part and the intra-block interleaved check bit part, and the intra-block interleaved system bit part is taken as a system bit part of the mother code codeword; and the intra-block interleaved check bit part is inter-block interleaved to obtain the inter-block interleaved check bit part, and the inter-block interleaved check bit part is taken as a check bit part of the mother code codeword.

It should be noted that, when coding the grouped information, in the case that the code rate of an encoder for performing the coding is 1/r, the number of the obtained uninterleaved check bit part is r−1.

In the above, the mode for coding the information bit sequence includes one of the following: Turbo code, tail biting Turbo code, and low density parity check code.

As for the third approach, L bits from $(N_{FB\_Buffer}/2-L/2)$ mod $(N_{FB\_Buffer})$ to $(N_{FB\_Buffer}/2+L/2-1)$ mod $(N_{FB\_Buffer})$ are sequentially read starting from the bit at the position of $(N_{FB\_Buffer}/2-L/2)$ mod $(N_{FB\_Buffer})$ in the mother code codeword (circular buffer), i.e., the $(N_{FB\_Buffer}/2-L/2)$ mod $(N_{FB\_Buffer})$th bit, the $(((N_{FB\_Buffer}/2-L/2)$ mod $(N_{FB\_Buffer}))+1)$th bit, the $(((N_{FB\_Buffer}/2-L/2)$ mod $(N_{FB\_Buffer}))+2)$th bit, . . . , the $((N_{FB\_Buffer}/2+L/2-1)$ mod $(N_{FB\_Buffer}))$th bit.

As for the fourth approach, L bits from $(N_{FB\_Buffer}-L/2)$ mod $(N_{FB\_Buffer})$ to $(N_{FB\_Buffer}+L/2-1)$ mod $(N_{FB\_Buffer})$ are sequentially read starting from the bit at the position of the $(N_{FB\_Buffer}-L/2)$ mod $(N_{FB\_Buffer})$ in the mother code codeword (circular buffer), i.e., the $(N_{FB\_Buffer}-L/2)$ mod $(N_{FB\_Buffer})$th bit, . . . , the $(((N_{FB\_Buffer}-L/2)$ mod $(N_{FB\_Buffer}))+1)$th bit, the $(((N_{FB\_Buffer}-L/2)$ mod $(N_{FB\_Buffer}))+2)$th bit, . . . , the $((N_{FB\_Buffer}+L/2-1)$ mod $(N_{FB\_Buffer}))$th bit.

As for the fifth approach, L bits from the first bit of the first check bit stream to the bit at the position of (the first bit of the first check bit stream+L−1) mod $(N_{FB\_Buffer})$ are sequentially read starting from the first bit of the first check bit stream in the mother code codeword (circular buffer), i.e., the first bit of the first check bit stream, the second bit of the first check bit stream, the third bit of the first check bit stream, . . . , (the first bit of the first check bit stream+L−1) mod $(N_{FB\_Buffer})$ bit.

As for the sixth approach, L bits from (the first bit of the first check bit stream+$N_{FB\_Buffer}/2$) to (the first bit of the first check bit stream+$N_{FB\_Buffer}/2$+L−1) mod $(N_{FB\_Buffer})$ are sequentially read starting from the position obtained by adding the first bit position of the first check bit stream and $N_{FB\_Buffer}/2$ in the mother code codeword (circular buffer), i.e., the (the first bit of the first check bit stream+$N_{FB\_Buffer}/2$)th bit, the ((the first bit of the first check bit stream+$N_{FB\_Buffer}/2$)+1)th bit, the ((the first bit of the first check bit stream+$N_{FB\_Buffer}/2$)+2)th bit, . . . , the ((the first bit of the first check bit stream+$N_{FB\_Buffer}/2$+L−1) mod $(N_{FB\_Buffer})$)th bit.

As for the seventh approach, L bits from $(N_{FB\_Buffer}/2)$ mod $(N_{FB\_Buffer})$ to $(N_{FB\_Buffer}/2+L-1)$ mod $(N_{FB\_Buffer})$ are sequentially read starting from the bit at the position of $(N_{FB\_Buffer}/2)$ mod $(N_{FB\_Buffer})$ in the mother code codeword (circular buffer).

As for the eighth approach, L bits from $(N_{FB\_Buffer}/2-L)$ mod $(N_{FB\_Buffer})$ to $(N_{FB\_Buffer}/2-1)$ mod $(N_{FB\_Buffer})$ are sequentially read starting from the bit at the position of $(N_{FB\_Buffer}/2-L)$ mod $(N_{FB\_Buffer})$ in the mother code codeword (circular buffer).

As for the ninth approach, L bits from (the first bit of the first check bit stream+M*func$((N_{FB\_Buffer}$−the first bit of the first check bit stream$)/(2*M))-L)$ mod $(N_{FB\_Buffer})$ to (the first bit of the first check bit stream+M*func$((N_{FB\_Buffer}$−the first bit of the first check bit stream$)/(2*M))-1)$ are sequentially read starting from the bit at the position of (the first bit of the first check bit stream+M*func$((N_{FB\_Buffer}$−the first bit of the first check bit stream$)/(2*M))-L)$ mod $(N_{FB\_Buffer})$ in the mother code codeword (circular buffer), wherein the M represents a modulation mode of the current HARQ subpacket, the func(x) represents rounding upward, rounding downward or rounding off for x.

As for the tenth approach, L bits from (the first bit of a first check bit stream−L) mod $(N_{FB\_Buffer})$ to (the first bit of the first check bit stream−1) are sequentially read starting from the bit at the position of the (the first bit of the first check bit stream−L) mod $(N_{FB\_Buffer})$ in the mother code codeword (circular buffer).

Since the start bit of the mother code codeword is regarded as the next bit of the last bit of the mother code codeword in the process of selecting bits from the mother code codeword to compose the HARQ subpacket, the mod operation is required in the method of the present embodiment.

In the present embodiment, by changing the approach for selecting bits of the subpacket from the mother code, the whole mother code data can be covered to the largest extent, and at the same time the overlapping phenomena occurring in the related art can be avoided to the largest extent, thereby enhancing the performance of the HARQ multiple retransmission link.

The implementation processes of the embodiments of the present invention will be described in detail in combination with examples hereinafter.

It should be explained that, the steps shown in the flow charts in the accompanying drawings can be performed in a computer system with a group of computer executable instructions. In addition, although the logical sequence is shown in the flow charts, in some case, the shown or described steps can be performed in a sequence different from that of the present invention.

Embodiment 1

A process procedure of a rate matching method used in a first rate matching device of an embodiment of the present invention will be described in detail by taking 1/3 code rate as the example (but it is not limited to 1/3 code rate) hereinafter.

The rate matching method according to the embodiment of the present invention includes: an information bit sequence is coded and interleaved to obtain a mother code codeword with a length $N_{FB\_Buffer}$, wherein the mother code codeword includes a system bit part and a check bit part. It is supposed that a value range of a SPID of the HARQ subpacket retransmission is 0, 1, 2, 3. Ten kinds of approaches for determining the start position of the HARQ subpacket are given hereinafter.

A first approach, the first L bits are selected starting from a predetermined start position in the mother code codeword with the length $N_{FB\_Buffer}$ to compose the HARQ subpacket, wherein the L is a predetermined length of the HARQ subpacket.

A second approach, the last L bits are selected from the mother code codeword with the length $N_{FB\_Buffer}$ to compose the HARQ subpacket, wherein the L is a predetermined length of the HARQ subpacket.

A third approach, L bits are selected by taking the middle position of the mother code codeword with the length $N_{FB\_Buffer}$ as the center position to compose the HARQ subpacket, wherein it is selected that both sides of the center position have approximately equal bit numbers as much as possible, and the L is a predetermined length of the HARQ subpacket.

A fourth approach, L bits are selected by taking the last bit position of the mother code codeword with the length $N_{FB\_Buffer}$ as the center position to compose the HARQ subpacket, wherein it is selected that both sides of the center position have approximately equal bit numbers as much as possible, and the L is a predetermined length of the HARQ subpacket.

A fifth approach, the first L bits are selected from the mother code codeword with the length $N_{FB\_Buffer}$ by taking the position of the first bit of a first check bit stream as the start position to compose the HARQ subpacket, wherein the L is a predetermined length of the HARQ subpacket.

A sixth approach, the first L bits are selected from the mother code codeword with the length $N_{FB\_Buffer}$ by taking the position obtained by adding the position of the first bit position of a first check bit stream and L/2 bit as the start position to compose the HARQ subpacket, wherein the L is a predetermined length of the HARQ subpacket.

A seventh approach, the first L bits are selected by taking the middle position of the mother code codeword as the start position to compose the HARQ subpacket, wherein the L is a predetermined length of the HARQ subpacket.

An eighth approach, L bits are selected by taking the middle position of the mother code codeword as the end position to compose the HARQ subpacket, wherein the L is a predetermined length of the HARQ subpacket.

A ninth approach, L bits are selected by taking the middle position between the last bit of the mother code codeword and the first bit of a first check bit stream as the end position to compose the HARQ subpacket, wherein the L is a predetermined length of the HARQ subpacket.

A tenth approach, L bits are selected by taking the position of the last bit of an information bit stream of the mother code codeword as the end position to compose the HARQ subpacket, wherein the L is a predetermined length of the HARQ subpacket.

When the value of the SPID is 0, 1, 2, or 3 (i.e. the first HARQ subpacket retransmission, the second HARQ subpacket retransmission, the third HARQ subpacket retransmission, or the fourth HARQ subpacket retransmission), any one of the above ten kinds of approaches for determining the start position of the HARQ subpacket can be adopted respectively according to the specific situation of the current HARQ subpacket.

It should be pointed out that, in the present embodiment 1, four rate matching modes are respectively taken as examples, wherein the first rate matching mode is of respectively selecting the first, the second, the third, the fourth approach for determining the start position of the subpacket when the value of the SPID is 0, 1, 2, 3; the second rate matching mode is of respectively selecting the first, the second, the fifth, the sixth approach for determining the start position of the subpacket when the value of the SPID is 0, 1, 2, 3; the third rate matching mode is of respectively selecting the first, the second, the seventh, the eighth approach for determining the start position of the subpacket when the value of the SPID is 0, 1, 2, 3; the fourth rate matching mode is of respectively selecting the first, the second, the ninth, the tenth approach for determining the start position of the subpacket when the value of the SPID is 0, 1, 2, 3. However, those skilled in the art should understand that, in the adaptive HARQ retransmission mechanism, any one of the above ten kinds of approaches for determining the start position of the HARQ subpackets can be selected respectively according to the situation of the current HARQ subpackets when the value of the SPID is 0, 1, 2, 3 in the embodiments of the present invention. That is to say, the first, the third, the fourth, the sixth approach for determining the start position of the subpacket can be respectively selected when the value of the SPID is 0, 1, 2, 3, or the first, the second, the fifth, the eighth approach for determining the start position of the subpacket can also be respectively selected when the value of the SPID is 0, 1, 2, 3.

Figure 7:
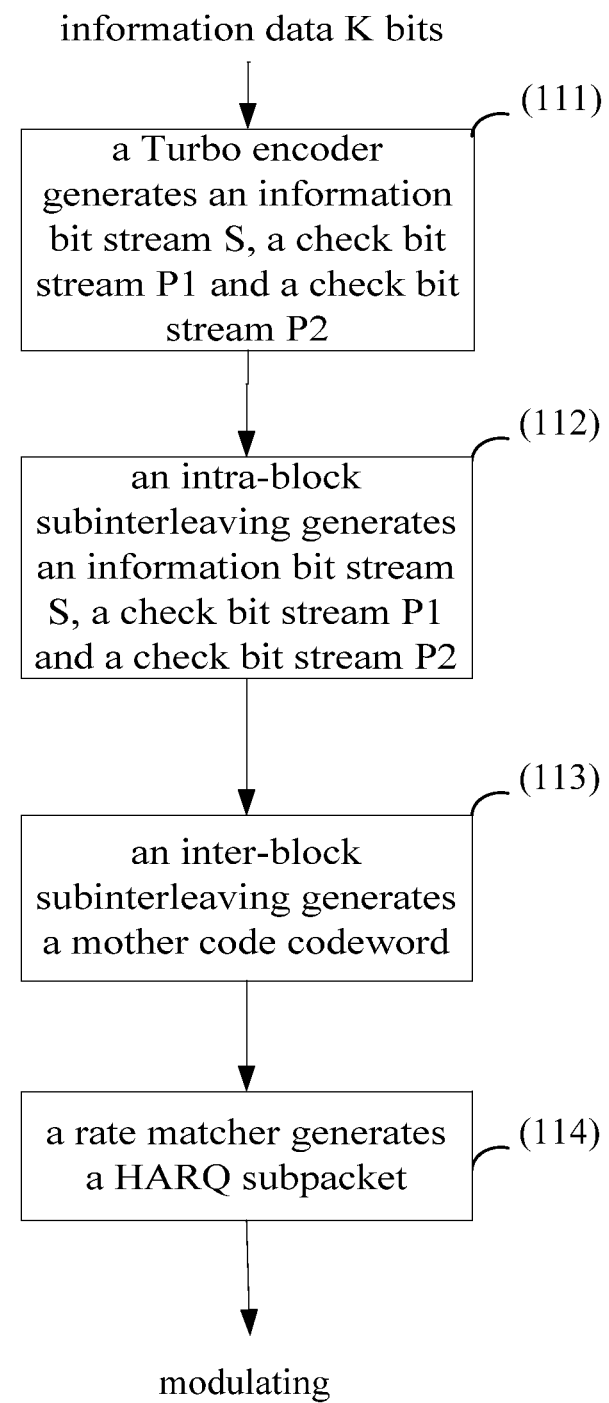
FIG. 7 is a process flowchart of a first rate matching device according to an embodiment 1 of the present invention.

FIG. 7 is a process flowchart of a first rate matching device according to an embodiment 1 of the present invention. As shown in FIG. 7, in the case of 1/3 code rate, the process procedure of the first rate matching mode adopted by the first rate matching device includes the following Steps 111-114.

Step 111, information with a length K is transmitted to a Turbo encoder with 1/3 code rate, to generate a system bit stream S, a first check bit stream P1 and a second check bit stream P2.

Step 112, the codewords (i.e., the system bit stream S, the first check bit stream P1 and the second check bit stream P2) coded by the Turbo encoder are intra-block interleaved respectively by a sub-interleaver, to generate a new system bit stream S, a new first check bit stream P1 and a new second check bit stream P2.

Step 113, the system bits are placed in the front of a circular buffer, the first parity check bit stream and the second parity check bit stream are placed in interlacement mode behind the system bit stream through an inter-block interleaver, and finally the circular buffer is formed, wherein the stored data is the above mother code, and the length of the mother code is $N_{FB\_Buffer}$ codeword bits, wherein since the mother code codeword is placed in the circular buffer, the next bit of the last bit in the mother code codeword is the first bit position of the mother code; and the index of the mother code starts from 0.

Step 114, codeword bits with required length of each HARQ transmission are sequentially read from the mother code to form a HARQ subpacket.

In the above, the reading position of each HARQ subpacket can be determined by the following process.

At first, the length of a HARQ subpacket is determined in advance, when the HARQ subpacket transmission is performed each time.

Secondly, the data content of the HARQ subpacket to be transmitted each time is circularly read from the mother code.

The method for reading the HARQ subpacket data of the first rate matching mode is as follows.

The value of the SPID is 0 when the HARQ subpacket is transmitted for the first time, namely, L1 bits are sequentially read starting from the 0th bit in the circular buffer, i.e. from the 0th bit, the 1st bit, the 2nd bit up to the (L1−1)th bit, wherein the L1 is the length of the first subpacket.

The value of the SPID is 1 when the HARQ subpacket is transmitted for the second time, namely, L2 bits are sequentially read starting from the bit at the position of the $(N_{FB\_Buffer}-L2)$ in the circular buffer, i.e. from the $(N_{FB\_Buffer}-L2)$th bit, the $(N_{FB\_Buffer}-L2+1)$th bit, the $(N_{FB\_Buffer}-L2+2)$th bit up to the $(N_{FB\_Buffer}-1)$th bit, wherein the L2 is the length of the second subpacket.

The value of the SPID is 2 when the HARQ subpacket is transmitted for the third time, namely, L3 bits are sequentially read starting from the bit at the position of the $(N_{FB\_Buffer}/2-L3/2)$ mod $(N_{FB\_Buffer})$ in the circular buffer, i.e. from the $(N_{FB\_Buffer}/2-L3/2)$ mod $(N_{FB\_Buffer})$th bit, the $((N_{FB\_Buffer}/2-L3/2)$ mod $(N_{FB\_Buffer}))+1$th bit, the $((N_{FB\_Buffer}/2-L3/2)$ mod $(N_{FB\_Buffer}))+2$th bit up to the $(N_{FB\_Buffer}/2+L3/2-1)$ mod $(N_{FB\_Buffer})$th bit, wherein the L3 is the length of the third subpacket.

The value of the SPID is 3 when the HARQ subpacket is transmitted for the fourth time, namely, L4 bits are sequentially read starting from the bit at the position of the $(N_{FB\_Buffer}-L4/2)$ mod $(N_{FB\_Buffer})$ in the circular buffer, i.e. the $(N_{FB\_Buffer}-L4/2)$ mod $(N_{FB\_Buffer})$th bit, the $((N_{FB\_Buffer}-L4/2)$ mod $(N_{FB\_Buffer}))+1$th bit, the $((N_{FB\_Buffer}-L4/2)$ mod $(N_{FB\_Buffer}))+2$th bit up to the $((N_{FB\_Buffer}+L4/2-1)$ mod $(N_{FB\_Buffer}))$th bit, wherein the L4 is the length of the fourth subpacket.

For example, there is an information bit data stream S with K=4800 bits. In the case of using 1/3 coding rate and CTC coding mode, the process of the first rate matching mode according to the embodiment of the present invention is as follows.

The information bit stream {a0, a1, . . . , a4799} is transmitted into a CTC encoder, to form an information bit stream S {a0, a1, . . . , a4799}, a check bit stream P1 {$p_1 0, p_1 1, \ldots, p_1 4799$}, a check bit stream P2 {$p_2 0, p_2 1, p_2 4799$}.

After the above information bit stream S, check bit stream P1 and check bit stream P2 pass through an intra-block sub-interleaver, a new system bit stream S {a0', a1', . . . , a4799'}, a new check bit stream P1 {$p_1 0', p_1 1', p_1 4799'$} and P2 {$p_2 0', p_2 1', p_2 4799'$} are formed.

After the new information bit stream S, the new check bit stream P1 and the new check bit stream P2 pass through the inter-block sub-interleaver, a mother code codeword is formed and is stored in the circular buffer, i.e. {m0, m1, . . . , m14399}. Namely, the $N_{FB\_Buffer}$ is 14400.

At last, Lk (k is 1, 2, 3, 4) codeword bits required by each HARQ transmission are sequentially read from the circular buffer to form a HARQ subpacket.

Specifically, when four HARQ transmission rate are respectively R1=5/6, R2=25/39, R3=25/48, and R4=25/38, in the above conditions, the rate matching is performed according to the first rate matching mode of the embodiment of the present invention.

Figure 9:
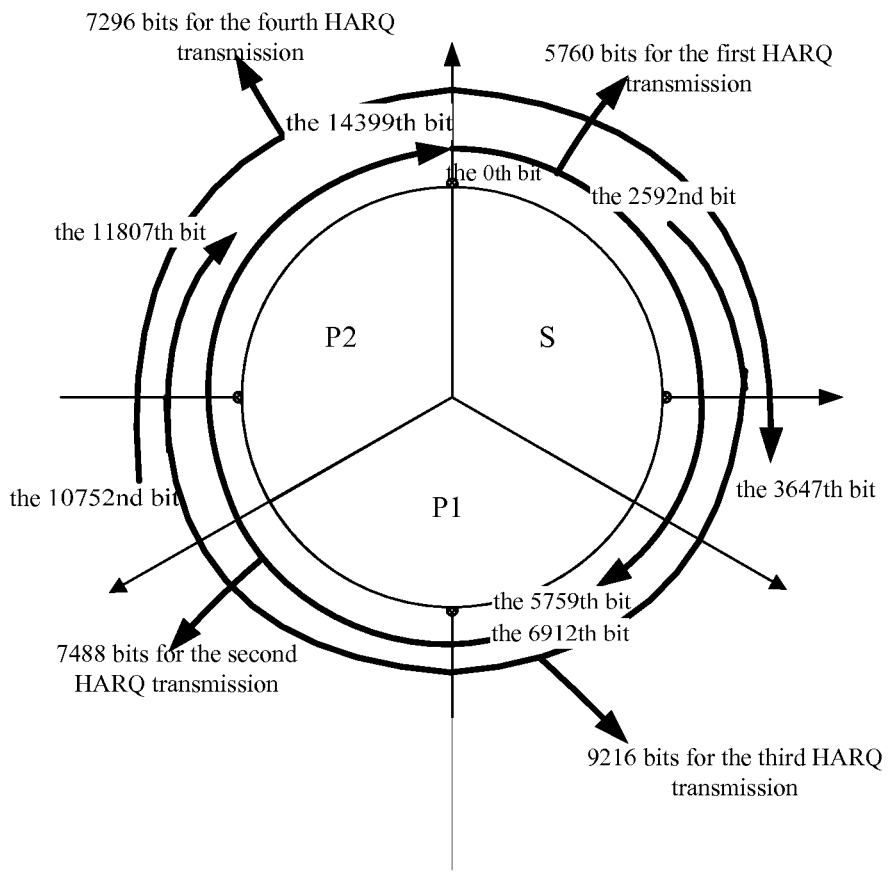
FIG. 9 is an overlapping circular schematic diagram of the first rate matching mode according to the embodiment 1 of the present invention.

FIG. 9 is an overlapping circular schematic diagram of the first rate matching mode according to the embodiment 1 of the present invention. As shown in FIG. 9, the read HARQ subpackets are respectively as follows: the first HARQ subpacket is {m0, m1, . . . , m5759} the second HARQ subpacket is {m6912, m6913, . . . , m14399}, the third HARQ subpacket is {m2592, m2593, . . . , m11807}, the fourth HARQ subpacket is {m10752, m10753, . . . , m14399, m0, m1, . . . , m3647}.

It can be seen that, in the first rate matching mode, although the mother code codeword {m5760, m5761, . . . , m6911} has totally 1152 bits not covered after the second HARQ subpacket transmission, the overlapping phenomenon does not exist. At the same time, with the third HARQ subpacket transmission and the fourth HARQ subpacket transmission, the mother code data which is not transmitted during the first transmission and the second transmission is transmitted to the largest extent, so as to cover the mother code data to the largest extent.

Therefore, with the rate matching mode of the embodiment of the present invention, the mother code codeword bit can be better covered in the same condition, and the overlapping phenomenon is reduced as much as possible, thereby increasing the performance of the HARQ link.

In the following embodiment, the first, the second, the fifth, and the sixth approaches for determining the start position of the subpacket are respectively selected when the value of the SPID is 0, 1, 2, 3. The process procedure of the rate matching method according to the embodiment of the present invention is as shown in FIG. 7, which is not described any more herein. The difference of the second rate matching mode is that, in the following embodiment, the first, the second, the fifth, the sixth approaches for determining the start position of the subpacket are respectively selected when the value of the SPID is 0, 1, 2, 3. The method for reading the HARQ subpacket data is as follows.

The value of the SPID is 0 when the HARQ subpacket is transmitted for the first time, namely, L1 bits are sequentially read starting from the bit at the position of the 0 in the circular buffer, i.e. from the 0th bit, the 1st bit, the 2nd bit up to the (L1−1)th bit, wherein the L1 is the length of the first subpacket.

The value of the SPID is 1 when the HARQ subpacket is transmitted for the second time, namely, L2 bits are sequentially read starting from the bit at the position of the $(N_{FB\_Buffer}-L2)$ in the circular buffer, i.e. from the $(N_{FB\_Buffer}-L2)$th bit, the $(N_{FB\_Buffer}-L2+1)$th bit, the $(N_{FB\_Buffer}-L2+2)$th bit up to the $(N_{FB\_Buffer}-1)$th bit, wherein the L2 is the length of the second subpacket.

The value of the SPID is 2 when the HARQ subpacket is transmitted for the third time, namely, L3 bits are sequentially read starting from the first bit in the circular buffer, i.e. from the first bit of the first check bit stream, the second bit of the first check bit stream, the third bit of the first check bit stream up to the (the first bit of the first check stream+L3−1) mod $(N_{FB\_Buffer})$th bit of the first check bit stream, wherein the L3 is the length of the third subpacket.

The value of the SPID is 3 when the HARQ subpacket is transmitted for the fourth time, namely, L4 bits are sequentially read starting from the bit at the position of (the first bit of a first check bit stream+$N_{FB\_Buffer}/2$) in the circular buffer, i.e. from (the first bit of the first check bit stream+$N_{FB\_Buffer}/2$)th bit, ((the first bit of the first check bit stream+$N_{FB\_Buffer}/2$)+1)th bit, ((the first bit of the first check bit stream+$N_{FB\_Buffer}/2$)+2)th bit up to the (the first bit of the first check stream+$N_{FB\_Buffer}/2+L4-1$) mod $(N_{FB\_Buffer})$th bit, wherein the L4 is the length of the fourth subpacket.

Figure 10:
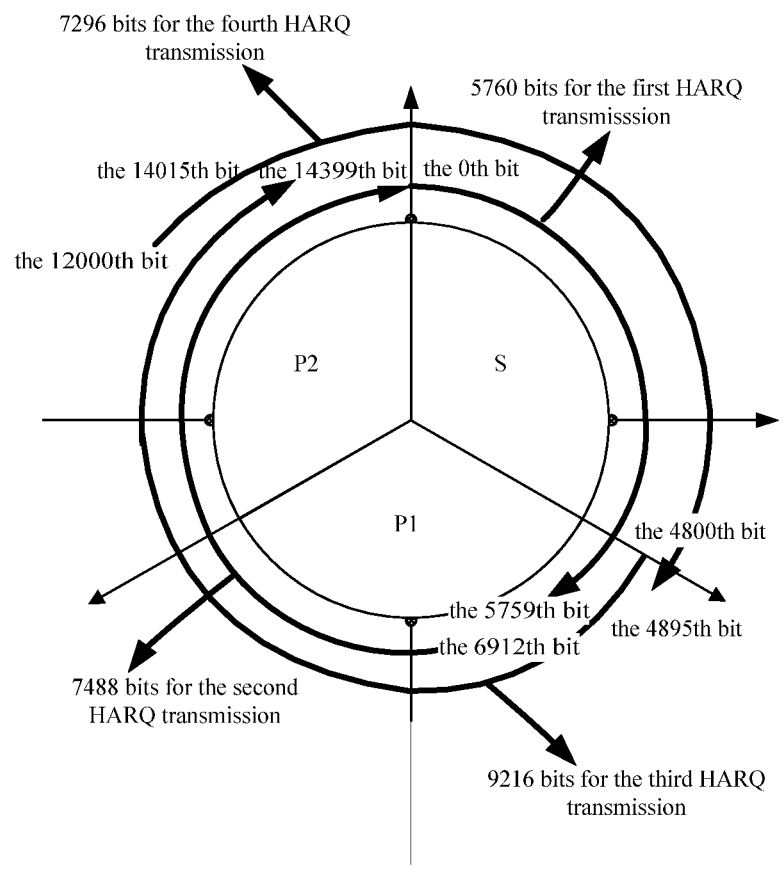
FIG. 10 is an overlapping circular schematic diagram of the second rate matching mode according to the embodiment 1 of the present invention.

FIG. 10 is an overlapping circular schematic diagram of the second rate matching mode according to the embodiment 1 of the present invention. As shown in FIG. 10, the read HARQ subpackets are respectively as follows: the first HARQ subpacket is {m0, m1, . . . , m5759}, the second HARQ subpacket is {m6912, m6913, . . . , m14399}, the third HARQ subpacket is {m4800, m4801, . . . , m14015}, and the fourth HARQ subpacket is {m12000, m12001, . . . , m14399, m0, m1, . . . , m4895}.

It can be seen that, in the second rate matching mode, although the mother code codeword {m5760, m5761, . . . , m6911} has totally 1152 bits not covered after the second HARQ subpacket transmission, the overlapping phenomenon does not exist. At the same time, with the third HARQ subpacket transmission and the fourth HARQ subpacket transmission, the mother code data which is not transmitted during the first transmission and the second transmission is transmitted to the largest extent, so as to cover the mother code data to the largest extent.

Therefore, with the second rate matching mode of the present embodiment, the mother code codeword bit can also be better covered in the same condition, and the overlapping phenomenon is reduced as much as possible, thereby increasing the performance of the HARQ link.

In the following embodiment, the first, the second, the seventh, and the eighth approaches for determining the start position of the subpacket are respectively selected when the value of the SPID is 0, 1, 2, 3. The process procedure of the rate matching method according to the embodiment of the present invention is as shown in FIG. 7, which is not described any more herein. The difference of the third rate matching mode is that, in the following embodiment, the first, the second, the seventh, and the eighth approaches for determining the start position of the subpacket are respectively selected when the value of the SPID is 0, 1, 2, 3. The method for reading the HARQ subpacket data is as follows.

The value of the SPID is 0 when the HARQ subpacket is transmitted for the first time, namely, L1 bits are sequentially read starting from the bit at the position of the 0 in the circular buffer, i.e. from the 0th bit, the 1st bit, the 2nd bit up to the (L1−1)th bit, wherein the L1 is the length of the first subpacket.

The value of the SPID is 1 when the HARQ subpacket is transmitted for the second time, namely, L2 bits are sequentially read starting from the bit at the position of the ($N_{FB\_Buffer}$−L2) in the circular buffer, i.e. from the ($N_{FB\_Buffer}$−L2)th bit, the ($N_{FB\_Buffer}$−L2+1)th bit, the ($N_{FB\_Buffer}$−L2+2)th bit up to the ($N_{FB\_Buffer}$−1)th bit, wherein the L2 is the length of the second subpacket.

The value of the SPID is 2 when the HARQ subpacket is transmitted for the third time, namely, L bits are sequentially read starting from the bit at the position of the ($N_{FB\_Buffer}$/2) mod ($N_{FB\_Buffer}$) in the circular buffer, i.e. from the ($N_{FB\_Buffer}$/2) mod ($N_{FB\_Buffer}$)th bit to the ($N_{FB\_Buffer}$/2+L−1) mod ($N_{FB\_Buffer}$)th bit, wherein the L3 is the length of the third subpacket.

The value of the SPID is 3 when the HARQ subpacket is transmitted for the fourth time, namely, L bits are sequentially read starting from the bit at the position of the ($N_{FB\_Buffer}$/2−L) mod ($N_{FB\_Buffer}$) in the circular buffer, i.e. from the ($N_{FB\_Buffer}$/2−L) mod ($N_{FB\_Buffer}$) th bit to the ($N_{FB\_Buffer}$/2−1) mod ($N_{FB\_Buffer}$)th bit, wherein the L4 is the length of the fourth subpacket.

Figure 14:
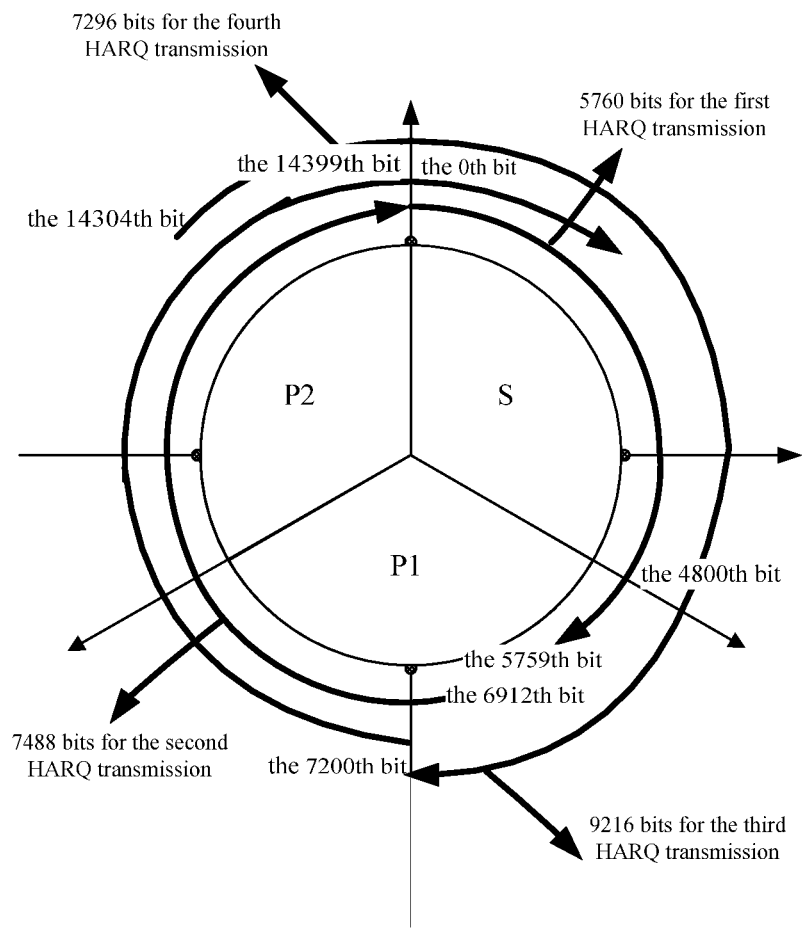
FIG. 14 is an overlapping circular schematic diagram of a third rate matching mode according to a method embodiment of the present invention.
Figure 15:
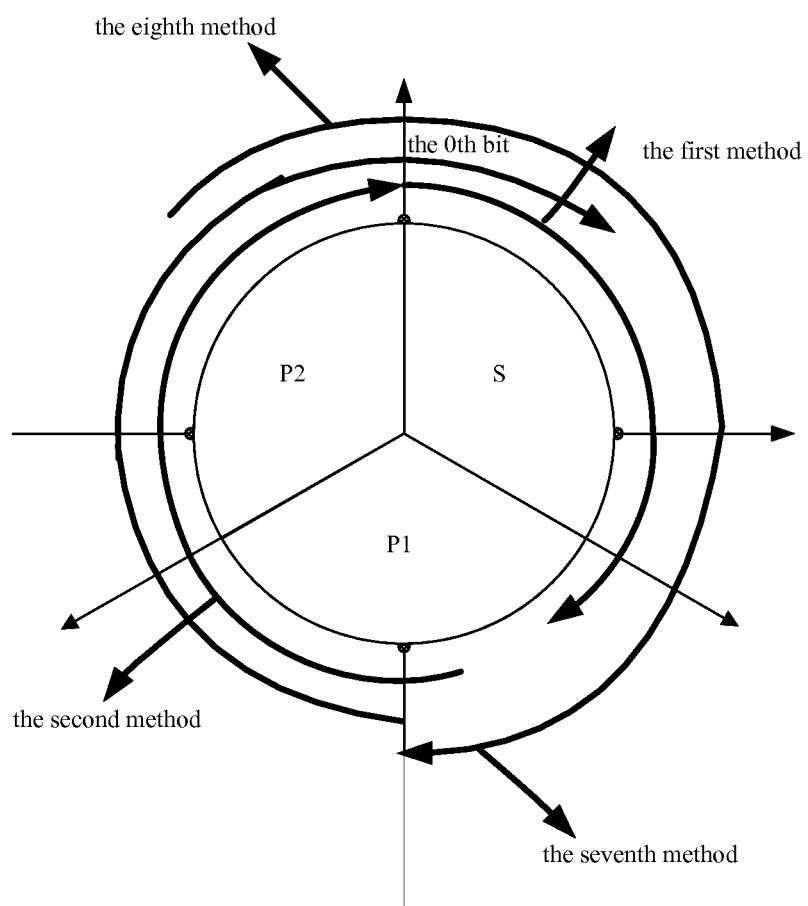
FIG. 15 is a circular schematic diagram of the third rate matching mode according to a method embodiment of the present invention.
Figure 16:
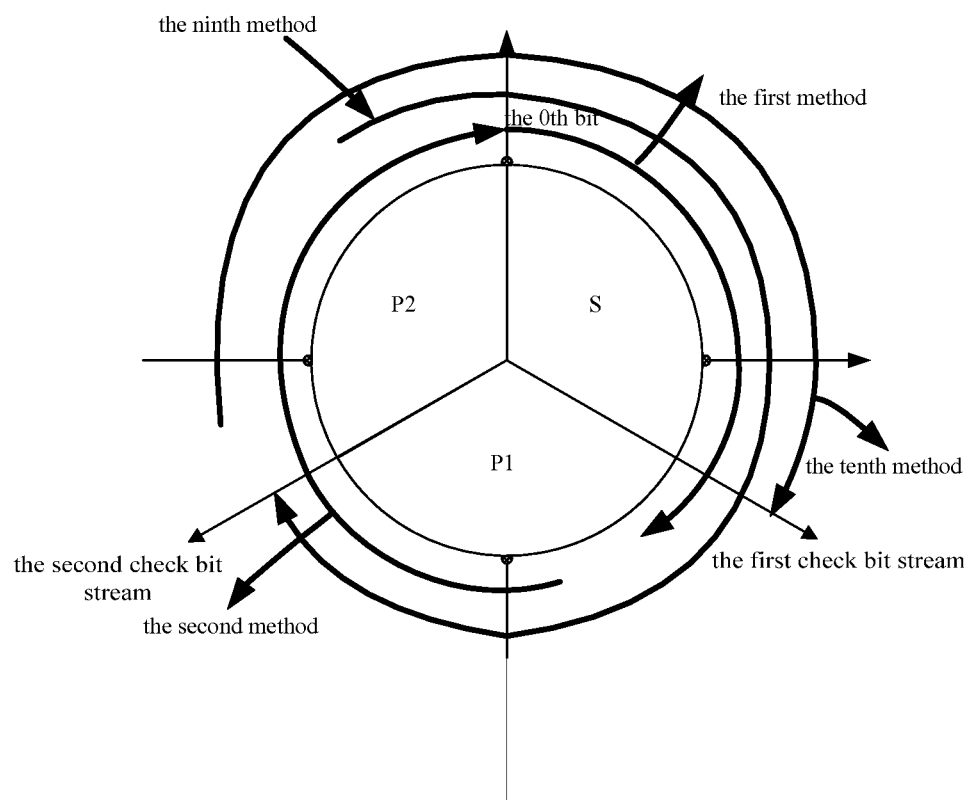
FIG. 16 is a circular schematic diagram of a fourth rate matching mode according to a method embodiment of the present invention.

FIG. 14 is an overlapping circular schematic diagram of the third rate matching mode according to the embodiment 1 of the present invention. As shown in FIG. 14, the read HARQ subpackets are respectively as follows: the first HARQ subpacket is {m0, m1, . . . , m5759}, the second HARQ subpacket is {m6912, m6913, . . . , m14399}, the third HARQ subpacket is {m7200, m7201, . . . , m12015}, and the fourth HARQ subpacket is {m14304, m14305, . . . , m14399, m0, m1, . . . , m7199}.

With the third rate matching mode of the present embodiment, the mother code codeword bit can also be better covered in the same condition, and the overlapping phenomenon is reduced as much as possible, thereby increasing the performance of the HARQ link.

In the following embodiment, the first, the second, the ninth, the tenth approaches for determining the start position of the subpacket are respectively selected when the value of the SPID is 0, 1, 2, 3. The process procedure of the rate matching method according to the embodiment of the present invention is as shown in FIG. 7, which is not described any more herein. The difference of the fourth rate matching mode is that, in the following embodiment, the first, the second, the ninth, the tenth approaches for determining the start position of the subpacket are respectively selected when the value of the SPID is 0, 1, 2, 3. The method for reading the HARQ subpacket data is as follows.

The value of the SPID is 0 when the HARQ subpacket is transmitted for the first time, namely, L1 bits are sequentially read starting from the bit at the position of the 0 in the circular buffer, i.e. from the 0th bit, the 1st bit, the 2nd bit up to the (L1−1)th bit, wherein the L1 is the length of the first subpacket.

The value of the SPID is 1 when the HARQ subpacket is transmitted for the second time, namely, L2 bits are sequentially read starting from the bit at the position of the ($N_{FB\_Buffer}$−L2) in the circular buffer, i.e. from the ($N_{FB\_Buffer}$−L2)th bit, the ($N_{FB\_Buffer}$−L2+1)th bit, the ($N_{FB\_Buffer}$−L2+2)th bit up to the ($N_{FB\_Buffer}$−1)th bit, wherein the L2 is the length of the second subpacket.

The value of the SPID is 2 when the HARQ subpacket is transmitted for the third time, namely, L3 bits are sequentially read starting from the bit at the position of the ((the first bit of the first check bit stream+M*func(($N_{FB\_Buffer}$−the first bit of the first check bit stream)/(2*M))−L3) mod ($N_{FB\_Buffer}$)) in the circular buffer, i.e. from the ((the first bit of the first check bit stream+M*func(($N_{FB\_Buffer}$−the first bit of the first check bit stream)/(2*M))−L3) mod ($N_{FB\_Buffer}$))th bit, the ((the first bit of the first check bit stream+M*func(($N_{FB\_Buffer}$−the first bit of the first check bit stream)/(2*M))−L3) mod ($N_{FB\_Buffer}$)+1)th bit, the ((the first bit of the first check bit stream+M*func(($N_{FB\_Buffer}$−the first bit of the first check bit stream)/(2*M))−L3) mod ($N_{FB\_Buffer}$)+2)th bit up to the (the first bit of the first check bit stream+M*func(($N_{FB\_Buffer}$−the first bit of the first check bit stream)/(2*M))−1)th bit, wherein the L3 is the length of the third subpacket, the M represents a modulation mode of the current HARQ subpacket, the func (x) represents rounding upward, rounding downward or rounding off for x.

The value of the SPID is 3 when the HARQ subpacket is transmitted for the fourth time, namely, L4 bits are sequentially read starting from the bit at the position of the ((the first bit of the first check bit stream−L4) mod ($N_{FB\_Buffer}$)) in the circular buffer, i.e. from the ((the first bit of the first check bit stream−L4) mod ($N_{FB\_Buffer}$))th bit, the ((the first bit of the first check bit stream−L4) mod ($N_{FB\_Buffer}$)+1)th bit, the ((the first bit of the first check bit stream−L4) mod ($N_{FB\_Buffer}$)+2)th bit up to the (the first bit of the first check stream−1)th bit.

Figure 17:
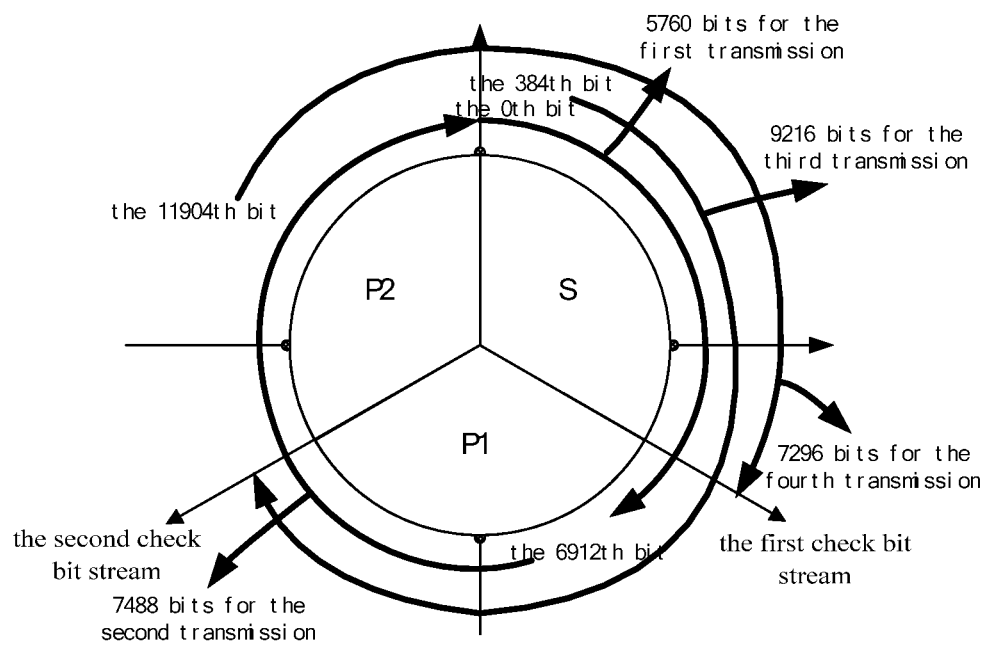
FIG. 17 is an overlapping circular schematic diagram of the fourth rate matching mode according to a method embodiment of the present invention.

FIG. 17 is an overlapping circular schematic diagram of the fourth rate matching mode according to the embodiment 1 of the present invention. As shown in FIG. 17, the read HARQ subpackets are respectively as follows: the first HARQ subpacket is {m0, m1, . . . , m5759}, the second HARQ subpacket is {m6912, m6913, . . . , m14399}, the third HARQ subpacket is {m12384, m12385, . . . , m9599}, and the fourth HARQ subpacket is {m11904, m11905, . . . , m14399, m0, m1, . . . , m4799}.

With the fourth rate matching mode of the present embodiment, the mother code codeword bit can also be better covered in the same condition, and the overlapping phenomenon is reduced as much as possible, thereby increasing the performance of the HARQ link.

Embodiment 2

The process procedure of the four rate matching modes used in a second rate matching device of an embodiment of the present invention will be described in detail, still by taking 1/3 code rate an the example (but it is not limited to 1/3 code rate) hereinafter. The detailed description of two rate matching methods of the present embodiment is obtained by referring to the embodiment 1, which is not described any more herein. Only the second rate matching device will be described in detail hereinafter.

Figure 8:
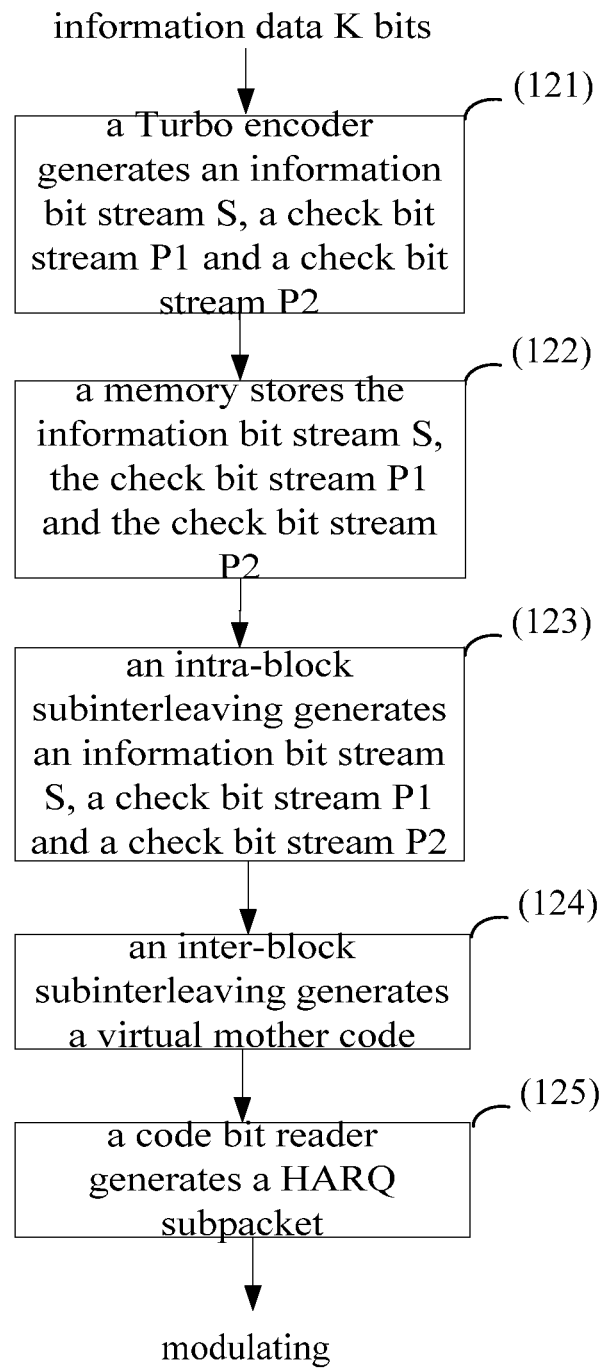
FIG. 8 is a process flowchart of a second rate matching device according to an embodiment 2 of the present invention.

FIG. 8 is a process flowchart of the second rate matching device according to an embodiment 2 of the present invention. As shown in FIG. 8, in the case of 1/3 code rate, the process procedure of the first rate matching mode adopted by the second rate matching device includes the following Steps 121-125.

Step 121, information with a length K is transmitted to a Turbo encoder with 1/3 code rate, to generate a system bit stream S, a first check bit stream P1 and a second check bit stream P2.

Step 122, the codewords (i.e., the system bit stream S, the first check bit stream P1 and the second check bit stream P2) coded by the Turbo encoder are stored in a memory.

Step 123, the codewords (i.e. the system bit stream S, the first check bit stream P1 and the second check bit stream P2) stored in the memory are intra-block interleaved respectively through an address generator, to generate a new system bit stream S, a new first check bit stream P1 and a new second check bit stream P2, so as to form a virtual circular buffer.

Step 124, the new system bit stream S is placed in the front of the virtual circular buffer, the first parity check bit stream P1 and the second parity check bit stream P2 are inter-block interleaved through an address generator, i.e. the first parity check bit stream P1 and the second parity check bit stream P2 are stored interlacedly behind the system bit stream in the virtual circular buffer, and finally the virtual circular buffer is formed, wherein the stored data is the virtual mother code, and the length of the mother code is $N_{FB\_Buffer}$ codeword bits. The virtual mother code codeword is placed in the virtual circular buffer, the next bit of the last bit in the mother code codeword is the 0th bit of the mother code; and the index of the mother code starts from 0.

Step 125, codeword bits are selected from the memory by a codeword bit reader according to an address generated by the address generator, to generate the HARQ subpacket for the current transmission. Namely, the codeword bits with the required length of each HARQ transmission are sequentially read from the virtual mother code, to form a HARQ subpacket.

In the above, the position of each reading of the HARQ subpacket can be determined by the following process.

At first, the length of a HARQ subpacket is determined in advance, when the HARQ subpacket transmission is performed each time.

Secondly, the data content of the HARQ subpacket to be transmitted each time is circularly read from the virtual mother code. The method for reading the HARQ subpacket data in the first rate matching method is learned by referring to the embodiment 1, which is not described any more herein.

For example, there is an information bit data stream S with K=4800 bits. In the case of using 1/3 coding rate and CTC coding mode, the process of the first rate matching mode according to the embodiment of the present invention is as follows.

The information bit stream {a0, a1, . . . , a4799} is transmitted into a CTC encoder, to form an information bit stream S {a0, a1, . . . , a4799}, a check bit stream P1 {$p_1 0, p_1 1, \ldots, p_1 4799$}, a check bit stream P2 {$p_2 0, p_2 1, p_2 4799$}.

After the information bit stream S, the check bit stream P1 and the check bit stream P2 are intra-block sub-interleaved in the address generator, a new system bit stream S {a0', a1', a4799'}, a new check bit stream P1 {$p_1 0', p_1 1, \ldots, p_1 4799'$} and P2 {$p_2 0', p_2 1', p_2 4799'$} are formed.

After the new system bit stream S, the new check bit stream P1 and the new check bit stream P2 are inter-block sub-interleaved again in the address generator, a virtual mother code codeword is formed and is stored in the virtual circular buffer, i.e. {m0, m1, . . . , m14399}.

At last, Lk (k is 1, 2, 3, 4) codeword bits required by each HARQ transmission are sequentially read from the virtual circular buffer to form a HARQ subpacket.

Specifically, when the four HARQ transmission rates are respectively R1=5/6, R2=25/39, R3=25/48, and R4=25/38, and in the above conditions, the rate matching is performed according to the first rate matching mode of the embodiment of the present invention, which is as shown in FIG. 9, wherein the first HARQ subpacket is {m0, m1, . . . , m5759}, the second HARQ subpacket is {m6912, m6913, . . . , m14399}, the third HARQ subpacket is {m2592, m2593, . . . , m11807}, the fourth HARQ subpacket is {m10752, m10753, . . . , m14399, m0, m1, . . . , m3647}.

In addition, the second rate matching device of the embodiment of the present invention is also applied to the second, the third, and the fourth rate matching modes, the difference of which is that, the second, the third and the fourth rate matching modes are respectively used when reading the HARQ subpacket data. The process procedure is also as shown in FIG. 8, which is not described any more herein.

It should be pointed out that, although the present invention is described in the above embodiments by taking 1/3 mother code rate and CTC coding as the example, those skilled in the art should understand that, the present invention can further use other code rates and other coding modes.

It should be pointed out that, although in the embodiment of the present invention, four rate matching modes are respectively taken as the example, wherein the first rate matching mode is of respectively selecting the first, the second, the third, the fourth approach for determining the start position of the subpacket when the value of the SPID is 0, 1, 2, 3; the second rate matching mode is of respectively selecting the first, the second, the fifth, the sixth approach for determining the start position of the subpacket when the value of the SPID is 0, 1, 2, 3; the third rate matching mode is of respectively selecting the first, the second, the seventh, the eighth approach for determining the start position of the subpacket when the value of the SPID is 0, 1, 2, 3; the fourth rate matching mode is of respectively selecting the first, the second, the ninth, the tenth approach for determining the start position of the subpacket when the value of the SPID is 0, 1, 2, 3, those skilled in the art should understand that, in the adaptive HARQ retransmission mechanism, any one of the above ten kinds of approaches for determining the start position of the HARQ subpackets can be selected respectively according to the situation of the current HARQ subpackets when the value of the SPID is 0, 1, 2, 3 in the embodiments of the present invention. That is to say, the first, the third, the fourth, the sixth approach for determining the start position of the subpacket can be respectively selected when the value of the SPID is 0, 1, 2, 3, or the first, the second, the fifth, the eighth approach for determining the start position of the subpacket can also be respectively selected when the value of the SPID is 0, 1, 2, 3.

Device Embodiment 1

Figure 11:
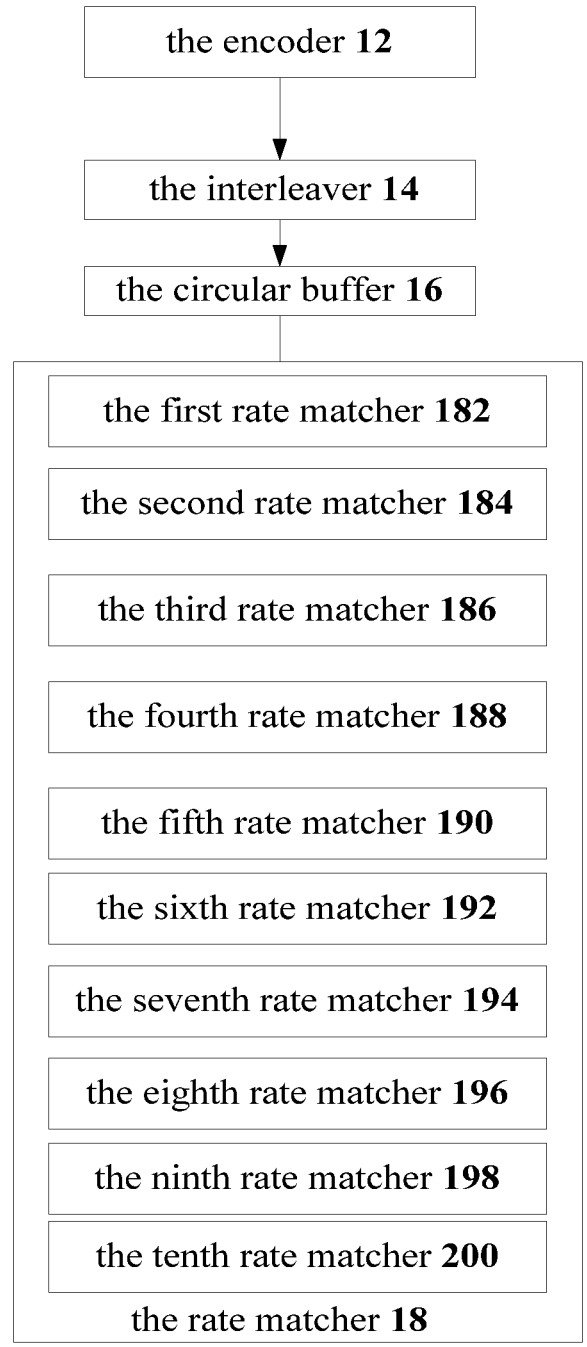
FIG. 11 is a structural block diagram of a rate matching device according to a device embodiment 1 of the present invention.

According to an embodiment of the present invention, a rate matching device is provided. FIG. 11 is a structural block diagram of the rate matching device according to a device embodiment 1 of the present invention. As shown in FIG. 11, the rate matching device includes: an encoder 12, an interleaver 14, a circular buffer 16, and a rate matcher 18. The above structure will be described hereinafter.

The encoder 12 is adapted to code a grouped information to generate a codeword with a length $N_{FB\_Buffer}$; the interleaver 14 connected to the encoder 12 is adapted to interleave the above codeword sequence with the length $N_{FB\_Buffer}$ to obtain an interleaved mother code codeword; the circular buffer 16 connected to the interleaver 14 is adapted to store the interleaved mother code codeword sequence; and the rate matcher 18 connected to the circular buffer 16 is adapted to select codeword bits from the mother code codeword to generate a HARQ subpacket for current transmission, wherein it is supposed that the value range of the SPID is 0, 1, 2, 3.

In the above, the rate matcher 18 is adapted to select bits from the mother code codeword to generate the HARQ subpacket for the current transmission. The rate matcher 18 includes: a first rate matcher 182 which is adapted to select the first L bits starting from a predetermined start position in the mother code codeword with the length $N_{FB\_Buffer}$ to compose a HARQ subpacket, wherein the L is a predetermined length of the HARQ subpacket; a second rate matcher 184 which is adapted to select the last L bits from the mother code codeword with the length $N_{FB\_Buffer}$ to compose a HARQ subpacket, wherein the L is a predetermined length of the HARQ subpacket; a third rate matcher 186 which is adapted to select L bits by taking the middle position of the mother code codeword with the length $N_{FB\_Buffer}$ as the center position to compose a HARQ subpacket, wherein it is selected that both sides of the center position have equal bit numbers as much as possible, and the L is a predetermined length of the HARQ subpacket; a fourth rate matcher 188 which is adapted to select L bits by taking the last bit position of the mother code codeword with the length $N_{FB\_Buffer}$ as the center position to compose a HARQ subpacket, wherein it is selected that both sides of the center position have equal bit numbers as much as possible, and the L is a predetermined length of the HARQ subpacket; a fifth rate matcher 190 which is adapted to select the first L bits from the mother code codeword by taking the position of the first bit of a first check bit stream as the start position to compose a HARQ subpacket, wherein the L is a predetermined length of the HARQ subpacket; a sixth rate matcher 192 which is adapted to select the first L bits from the mother code codeword by taking the position obtained by adding the first bit position of a first check bit stream and L/2 bit as the start position to compose a HARQ subpacket, wherein the L is a predetermined length of the HARQ subpacket; a seventh rate matcher 194 which is adapted to select the first L bits by taking the middle position of the mother code codeword as the start position to compose a HARQ subpacket, wherein the L is a predetermined length of the HARQ subpacket; a eighth rate matcher 196 which is adapted to select L bits by taking the middle position of the mother code codeword as the end position to compose a HARQ subpacket, wherein the L is a predetermined length of the HARQ subpacket; a ninth rate matcher 198 which is adapted to select L bits by taking the middle position between the last bit of the mother code codeword and the first bit of a first check bit stream as the end position to compose a HARQ subpacket, wherein the L is a predetermined length of the HARQ subpacket; and a tenth rate matcher 200 which is adapted to select L bits by taking the position of the last bit of an information bit stream of the mother code codeword as the end position to compose a HARQ subpacket, wherein the L is a predetermined length of the HARQ subpacket.

Figure 12:
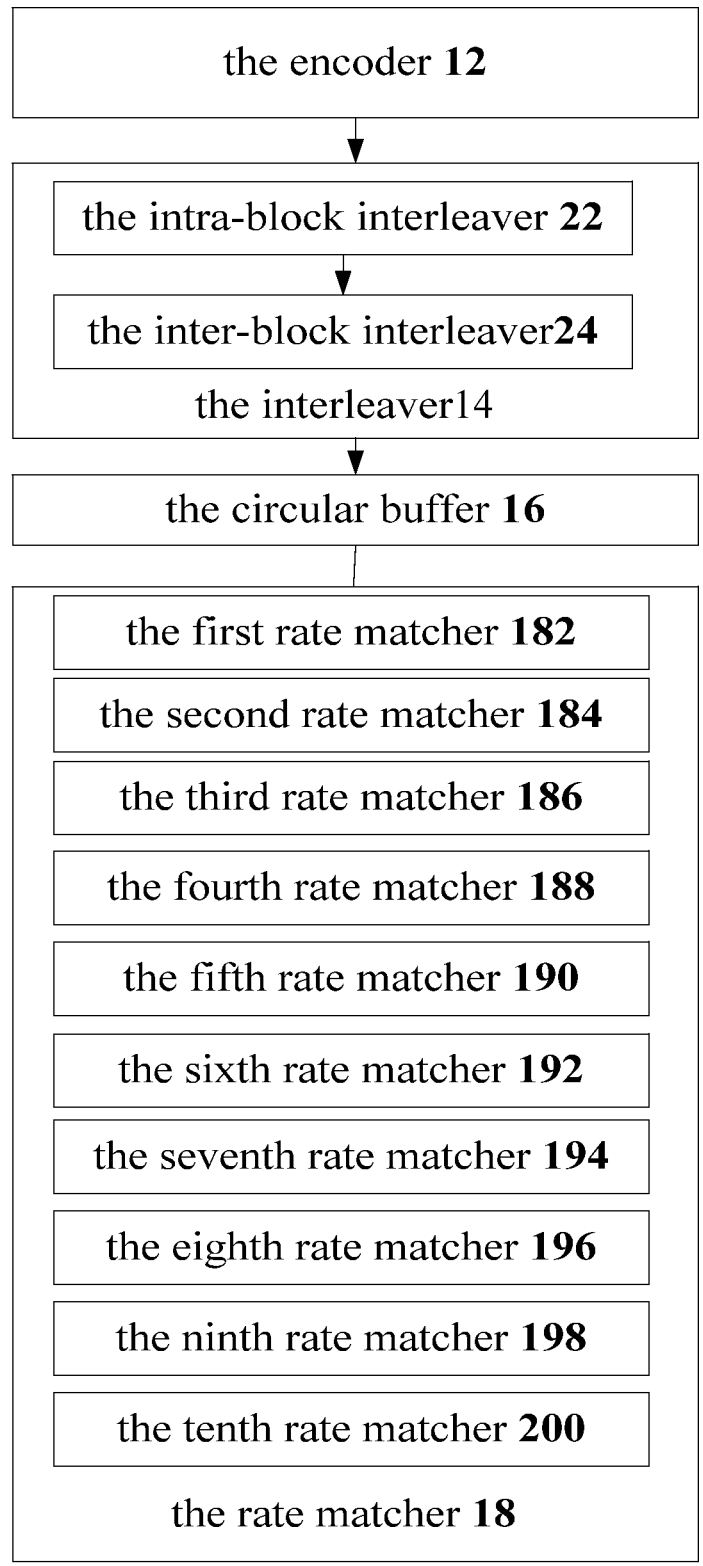
FIG. 12 is a specific structural block diagram of the rate matching device according to the device embodiment 1 of the present invention.

FIG. 12 is a specific structural block diagram of the rate matching device according to the device embodiment 1 of the present invention. As shown in FIG. 12, the above interleaver 14 includes an intra-block interleaver 22 and an inter-block interleaver 24. The above structure will be described hereinafter.

The intra-block interleaver 22 is adapted to group and intra-block interleave the coded information, to obtain an intra-block interleaved check bit part or further obtain an intra-block interleaved system bit part. The inter-block interleaver 24 is connected to the intra-block interleaver 22, and is adapted to inter-block interleave the intra-block interleaved check bit part to obtain an inter-block interleaved check bit part.

The above circular buffer 16 is adapted to store the intra-block interleaved system bit part or the uninterleaved system bit part into the circular buffer 16 at the start position, as a system bit part of the mother code codeword. The circular buffer 16 is further adapted to store the inter-block interleaved check bit part into the circular buffer 16 at the position behind the system bit part.

When the value of the SPID is 0, 1, 2, 3 (i.e., the first HARQ subpacket retransmission, the second HARQ subpacket retransmission, the third HARQ subpacket retransmission, and the fourth HARQ subpacket retransmission), any one of the first rate matcher 182, the second rate matcher 184, the third rate matcher 186, the fourth rate matcher 188, the fifth rate matcher 190, the sixth rate matcher 192, the seventh rate matcher 194, the eighth rate matcher 196, the ninth rate matcher 198, and the tenth rate matcher 200 can be used according to the situation of the current HARQ subpacket.

As for the third rate matcher 186, L bits are sequentially read starting from the bit at the position of the $(N_{FB\_Buffer}/2-L/2) \mod (N_{FB\_Buffer})$ in the mother code codeword (circular buffer), i.e., the $(N_{FB\_Buffer}/2-L/2) \mod (N_{FB\_Buffer})$th bit, the $(((N_{FB\_Buffer}/2-L/2) \mod (N_{FB\_Buffer}))+1)$th bit, the $(((N_{FB\_Buffer}/2-L/2) \mod (N_{FB\_Buffer}))+2)$th bit, . . . , the $(N_{FB\_Buffer}/2+L/2-1) \mod (N_{FB\_Buffer})$th bit.

As for the fourth rate matcher 188, L bits are sequentially read starting from the bit at the position of the $(N_{FB\_Buffer}-L/2) \mod (N_{FB\_Buffer})$ in the mother code codeword (circular buffer), i.e., the $(N_{FB\_Buffer}-L/2) \mod (N_{FB\_Buffer})$th bit, the $(((N_{FB\_Buffer}-L/2) \mod (N_{FB\_Buffer}))+1)$th bit, the $(((N_{FB\_Buffer}-L/2) \mod (N_{FB\_Buffer}))+2)$th bit, . . . , the $(N_{FB\_Buffer}+L/2-1) \mod (N_{FB\_Buffer})$th bit.

As for the fifth rate matcher 190, L bits (the first bit of the first check bit stream to (the first bit of the first check bit stream+L−1) $\mod (N_{FB\_Buffer})$ bit) are sequentially read starting from the first bit of the first check bit stream in the mother code codeword (circular buffer), i.e., the first bit of the first check bit stream, the second bit of the first check bit stream, the third bit of the first check bit stream, . . . , the (the first bit of the first check bit stream+L−1) $\mod (N_{FB\_Buffer})$th bit.

As for the sixth rate matcher 192, L bits (the bit at the position obtained by adding the first bit of the first check bit stream and $N_{FB\_Buffer}/2$ to the bit at the position of (the first bit of the first check bit stream+$N_{FB\_Buffer}/2$+L−1) mod $(N_{FB\_Buffer})$, are sequentially read starting from the position obtained by adding the first bit position of the first check bit stream and $N_{FB\_Buffer}/2$ in the mother code codeword (circular buffer), i.e., (the first bit of the first check bit stream+$N_{FB\_Buffer}/2$)th bit, (((the first bit of the first check bit stream+$N_{FB\_Buffer}/2$)+1)th bit, (((the first bit of the first check bit stream+$N_{FB\_Buffer}/2$)+2)th bit, . . . , (the first bit of the first check bit stream+$N_{FB\_Buffer}/2$+L−1) mod ($N_{FB\_Buffer}$)th bit.

As for the seventh rate matcher 194, L bits (the bit at the position of the ($N_{FB\_Buffer}/2$) mod ($N_{FB\_Buffer}$) to the bit at the position of the ($N_{FB\_Buffer}/2$+L−1) mod ($N_{FB\_Buffer}$)) are sequentially read starting from the bit at the position of the ($N_{FB\_Buffer}/2$) mod ($N_{FB\_Buffer}$) in the mother code codeword (circular buffer).

As for the eighth rate matcher 196, L bits (the bit at the position of the ($N_{FB\_Buffer}/2$−L) mod ($N_{FB\_Buffer}$) to the bit at the position of the ($N_{FB\_Buffer}/2$−1) mod ($N_{FB\_Buffer}$) are sequentially read starting from the bit at the position of the ($N_{FB\_Buffer}/2$−L) mod ($N_{FB\_Buffer}$) in the mother code codeword (circular buffer).

As for the ninth rate matcher 198, L bits (the bit at the position of (the first bit of the first check bit stream+M*func(($N_{FB\_Buffer}$−the first bit of the first check bit stream)/(2*M))−L) mod ($N_{FB\_Buffer}$)) to the bit at the position of (the first bit of the first check bit stream+M*func(($N_{FB\_Buffer}$−the first bit of the first check bit stream)/(2*M))−1), are sequentially read starting from the bit at the position of (the first bit of the first check bit stream+M*func(($N_{FB\_Buffer}$−the first bit of the first check bit stream)/(2*M))−L) mod ($N_{FB\_Buffer}$) in the mother code codeword (circular buffer), wherein the M represents a modulation mode of the current HARQ subpacket, and the func(x) represents rounding upward, rounding downward or rounding off for x.

As for the tenth rate matcher 200, L bits (the bit at the position of (the first bit of the first check bit stream−L) mod ($N_{FB\_Buffer}$) to the bit at the position of (the first bit of the first check bit stream−1) are sequentially read starting from the bit at the position of (the first bit of the first check bit stream−L) mod ($N_{FB\_Buffer}$) in the mother code codeword (circular buffer).

Since the start bit of the mother code codeword is regarded as the next bit of the last bit of the mother code codeword in the process of selecting bits from the mother code codeword to compose the HARQ subpacket, the mod operation is required in the method.

The device of the present embodiment is applicable to the first, the second, the third and the fourth rate matching modes provided by the present invention, the difference of which is only that: the first rate matching mode is of respectively selecting the first rate matcher, the second rate matcher, the third rate matcher, and the fourth rate matcher when the value of the SPID is 0, 1, 2, 3; the second rate matching mode is of respectively selecting the first rate matcher, the second rate matcher, the fifth rate matcher, and the sixth rate matcher when the value of the SPID is 0, 1, 2, 3; the third rate matching mode is of respectively selecting the first rate matcher, the second rate matcher, the seventh rate matcher, and the eighth rate matcher when the value of the SPID is 0, 1, 2, 3; the fourth rate matching mode is of respectively selecting the first rate matcher, the second rate matcher, the ninth rate matcher, and the tenth rate matcher when the value of the SPID is 0, 1, 2, 3, which is not described any more herein.

Device Embodiment 2

Figure 13:
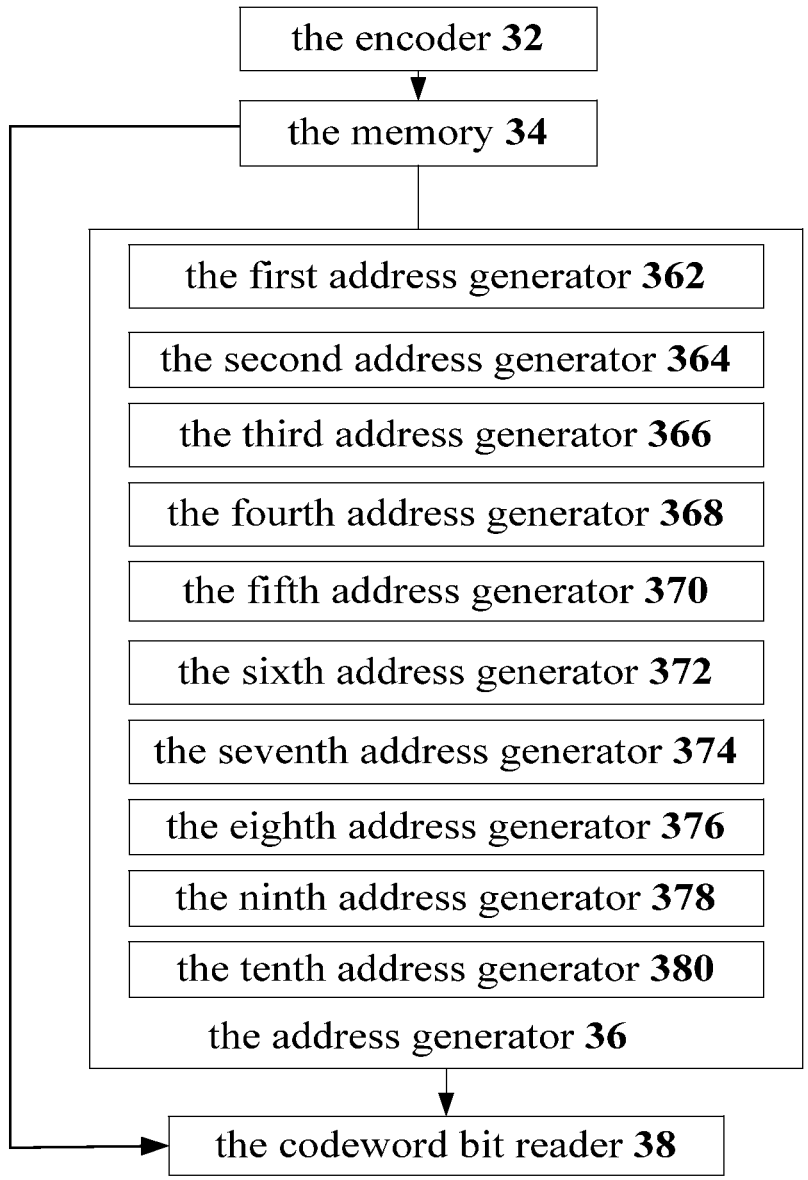
FIG. 13 is a structural block diagram of a rate matching device according to a device embodiment 2 of the present invention.

According to an embodiment of the present invention, a second rate matching device is provided. FIG. 13 is a structural block diagram of the rate matching device according to the device embodiment 2 of the present invention. As shown in FIG. 13, the device includes: an encoder 32, a memory 34, an address generator 36, and a codeword bit reader 38. The above structure will be described hereinafter.

The encoder 32 is adapted to code a grouped information to generate a codeword with a length $N_{FB\_Buffer}$. The memory 34 is connected to the encoder 32, and is adapted to store the coded codeword. The address generator 36 is connected to the memory, and is adapted to generate corresponding address of each codeword bit of a current HARQ subpacket in the memory, and adapted to interleave the codeword stored in the memory to generate a virtual circular buffer with the length $N_{FB\_Buffer}$, and store it in the memory, with the data of the virtual circular buffer as a mother code codeword, and continuously select from the mother code codeword the address corresponding to a codeword bit section for generating the current HARQ subpacket, wherein it is supposed that the value range of the SPID is 0, 1, 2, 3. The above address generator 36 includes: a first address generator 362 which is adapted to select the first L bits starting from a predetermined start position in the mother code codeword with the length $N_{FB\_Buffer}$ to compose a HARQ subpacket, wherein the L is a predetermined length of the HARQ subpacket; a second address generator 364 which is adapted to select the last L bits from the mother code codeword with the length $N_{FB\_Buffer}$ to compose a HARQ subpacket, wherein the L is a predetermined length of the HARQ subpacket; a third address generator 366 which is adapted to select L bits by taking the middle position of the mother code codeword as the center position to compose a HARQ subpacket, wherein it is selected that both sides of the center position have approximately equal bit numbers, and the L is a predetermined length of the HARQ subpacket; a fourth address generator 368 which is adapted to select L bits by taking the last bit position of the mother code codeword as the center position to compose a HARQ subpacket, wherein it is selected that both sides of the center position have approximately equal bit numbers, and the L is a predetermined length of the HARQ subpacket; the codeword bit reader 38 which is connected to the address generator 36 and the memory 34, and is adapted to select codeword bits from the memory 34 according to the address selected by the address generator 36 to generate the HARQ subpacket for current transmission; a fifth address generator 370 which is adapted to select the first L bits from the mother code codeword by taking the position of the first bit of a first check bit stream as the start position to compose a HARQ subpacket, wherein the L is a predetermined length of the HARQ subpacket; a sixth address generator 372 which is adapted to select the first L bits from the mother code codeword by taking the position obtained by adding the first bit position of a first check bit stream and L/2 bit as the start position to compose a HARQ subpacket, wherein the L is a predetermined length of the HARQ subpacket; a seventh address generator 374 which is adapted to select the first L bits by taking the middle position of the mother code codeword as the start position to compose a HARQ subpacket, wherein the L is a predetermined length of the HARQ subpacket; a eighth address generator 376 which is adapted to select L bits by taking the middle position of the mother code codeword as the end position to compose a HARQ subpacket, wherein the L is a predetermined length of the HARQ subpacket; a ninth address generator 378 which is adapted to select L bits by taking the middle position between the last bit of the mother code codeword and the first bit of a first check bit stream as the end position to compose a HARQ subpacket, wherein the L is a predetermined length of the HARQ subpacket; and a tenth address generator 380 which is adapted to select L bits by taking the position of the last bit of an information bit stream of the mother code codeword as the end position to compose a HARQ subpacket, wherein the L is a predetermined length of the HARQ subpacket.

When the value of the SPID is 0, 1, 2, 3, i.e., when the first HARQ subpacket retransmission, the second HARQ subpacket retransmission, the third HARQ subpacket retransmission, or the fourth HARQ subpacket retransmission is performed, any one of the first address generator 362, the second address generator 364, the third address generator 366, the fourth address generator 368, the fifth address generator 370, the sixth address generator 372, the seventh address generator 374, the eighth address generator 376, the ninth address generator 378, and the tenth address generator 380 can be used according to the situation of the current HARQ subpacket.

As for the third address generator 366, L bits are sequentially read starting from the bit at the position of the $(N_{FB\_Buffer}/2-L/2)$ mod $(N_{FB\_Buffer})$ in the mother code codeword (circular buffer), i.e., the $(N_{FB\_Buffer}/2-L/2)$ mod $(N_{FB\_Buffer})$th bit, the $(((N_{FB\_Buffer}/2-L/2)$ mod $(N_{FB\_Buffer}))+1)$th bit, the $(((N_{FB\_Buffer}/2-L/2)$ mod $(N_{FB\_Buffer}))+2)$th bit, . . . , the $(N_{FB\_Buffer}/2+L/2-1)$ mod $(N_{FB\_Buffer})$th bit.

As for the fourth address generator 368, L bits are sequentially read starting from the bit at the position of the $(N_{FB\_Buffer}-L/2)$ mod $(N_{FB\_Buffer})$ in the mother code codeword (circular buffer), i.e., the $(N_{FB\_Buffer}-L/2)$ mod $(N_{FB\_Buffer})$th bit, the $(((N_{FB\_Buffer}-L/2)$ mod $(N_{FB\_Buffer}))+1)$th bit, the $(((N_{FB\_Buffer}-L/2)$ mod $(N_{FB\_Buffer}))+2)$th bit, . . . , the $(N_{FB\_Buffer}+L/2-1)$ mod $(N_{FB\_Buffer})$th bit.

As for the fifth address generator 370, L bits (the first bit of the first check bit stream to the bit at the position of (the first bit of the first check bit stream+L−1) mod $(N_{FB\_Buffer})$) are sequentially read starting from the first bit of the first check bit stream in the mother code codeword (the virtual circular buffer), i.e., the first bit of the first check bit stream, the second bit of the first check bit stream, the third bit of the first check bit stream, . . . , the bit at the position of (the first bit of the first check bit stream+L−1) mod $(N_{FB\_Buffer})$.

As for the sixth address generator 372, L bits (the bit at the position of (the first bit of the first check bit stream+$N_{FB\_Buffer}/2$) to the bit at the position of (the first bit of the first check bit stream+$N_{FB\_Buffer}/2$+L−1) mod $(N_{FB\_Buffer})$) are sequentially read starting from the bit at the position of (the first bit of the first check bit stream+$N_{FB\_Buffer}/2$) in the mother code codeword (the virtual circular buffer), i.e., the bit at the position of (the first bit of the first check bit stream+$N_{FB\_Buffer}/2$), the bit at the position of ((the first bit of the first check bit stream+$N_{FB\_Buffer}/2$)+1), the bit at the position of ((the first bit of the first check bit stream+$N_{FB\_Buffer}/2$)+2), . . . , the bit at the position of (the first bit of the first check bit stream+$N_{FB\_Buffer}/2$+L−1) mod $(N_{FB\_Buffer})$.

As for the seventh address generator 374, L bits (the bit at the position of $(N_{FB\_Buffer}/2)$ mod $(N_{FB\_Buffer})$ to the bit at the position of $(N_{FB\_Buffer}/2+L1)$ mod $(N_{FB\_Buffer})$) are sequentially read starting from the bit at the position of $(N_{FB\_Buffer}/2)$ mod $(N_{FB\_Buffer})$ in the mother code codeword (the virtual circular buffer).

As for the eighth address generator 376, L bits (the bit at the position of $N_{FB\_Buffer}/2-L)$ mod $(N_{FB\_Buffer})$ to the bit at the position of $(N_{FB\_Buffer}/2-1)$ mod $(N_{FB\_Buffer})$) are sequentially read starting from the bit at the position of $(N_{FB\_Buffer}/2-L)$ mod $(N_{FB\_Buffer})$ in the mother code codeword (the virtual circular buffer).

As for the ninth address generator 378, L bits (the bit at the position of (the first bit of the first check bit stream+M*func $((N_{FB\_Buffer}$–the first bit of the first check bit stream$)/(2*M))$–L) mod $(N_{FB\_Buffer})$ to the bit at the position of (the first bit of the first check bit stream+M*func$((N_{FB\_Buffer}$–the first bit of the first check bit stream$)/(2*M))$–1)) are sequentially read starting from the bit at the position of (the first bit of the first check bit stream+M*func$((N_{FB\_Buffer}$–the first bit of the first check bit stream$)/(2*M))$–L) mod $(N_{FB\_Buffer})$ in the mother code codeword (the virtual circular buffer), wherein the M represents a modulation mode of the current HARQ subpacket, the func(x) represents rounding upward, rounding downward or rounding off for x.

As for the tenth address generator 380, L bits (the bit at the position of $(N_{FB\_Buffer}/2-L)$ mod $(N_{FB\_Buffer})$ to the bit at the position of $(N_{FB\_Buffer}/2-1)$ mod $(N_{FB\_Buffer})$) are sequentially read starting from the bit at the position of $(N_{FB\_Buffer}/2-L)$ mod $(N_{FB\_Buffer})$ in the mother code codeword (the virtual circular buffer).

Since the start bit of the mother code codeword is regarded as the next bit of the last bit of the mother code codeword in the process of selecting bits from the mother code codeword to compose the HARQ subpacket, the mod operation is required in the present embodiment.

The device of the present embodiment is also applicable to the first, the second, the third and the fourth rate matching modes provided by the embodiments of the present invention, the difference of which is only that: the first rate matching mode is of respectively selecting the first address generator, the second address generator, the third address generator, and the fourth address generator when the value of the SPID is 0, 1, 2, 3; the second rate matching mode is of respectively selecting the first address generator, the second address generator, the fifth address generator, and the sixth address generator when the value of the SPID is 0, 1, 2, 3; the third rate matching mode is of respectively selecting the first address generator, the second address generator, the seventh address generator, and the eighth address generator when the value of the SPID is 0, 1, 2, 3; and the fourth rate matching mode is of respectively selecting the first address generator, the second address generator, the ninth address generator, and the tenth address generator when the value of the SPID is 0, 1, 2, 3, which is not described any more herein.

To sum up, with the above embodiments of the present invention, a solution of changing the manner of selecting bits in the mother code codeword to decrease the overlapping phenomena is adopted, so as to solve the problem that the probability of the overlapping phenomena occurring in the process of the rate matching is high, achieve the effect of covering the over all mother code areas as much as possible, and further increase the performance of HARQ multiple retransmission link.

In addition, the implementation of the present invention does not modify the system architecture and the current process flow, which is easy for implementation and is convenient for promotion in the technical fields, and has strong industrial applicability.

Obviously, it should be understood by those skilled in the art that, each of the above modules or steps of the present invention can be implemented by universal computing devices, and can be centralized at a single computing device or distributed at the network composed of multiple computing devices. Alternatively, they can be implemented by program codes executable by the computing devices, therefore which can be stored in a storage device and executed by the computing devices, or which can be respectively manufactured as various integrated circuit modules, or multiple modules or steps of which can be manufactured as single integrated circuit module. Therefore, the present invention is not limited to any specific combination of hardware and software.

The above description is only preferred embodiments of the present invention, and is not for limiting the present invention. For those skilled in the art, there may be various modifications and changes to the present invention. Any modification, equivalent replacement and improvement made within the spirit and principle of the present invention should be included in the protection scope of the present invention.

What is claimed is:

1. A rate matching method executed by a mobile terminal, the method comprising:
   coding and interleaving an information bit sequence to obtain a mother code codeword with a length $N_{FB\_Buffer}$; and
   selecting bits from the mother code codeword to generate a hybrid automatic repeat request (HARQ) subpacket for current transmission,
   wherein in the case that a value range of a HARQ subpacket identifier (SPID) of the HARQ subpacket retransmission is 0, 1, 2 or 3, an approach for determining a start position of the HARQ subpacket when generating the HARQ subpacket comprises one or more of the following:
      a first approach of selecting the first L bits from the start position in the mother code codeword to compose the HARQ subpacket, wherein the L is a predetermined length of the HARQ subpacket;
      a second approach of selecting the last L bits from the mother code codeword to compose the HARQ subpacket, wherein the L is a predetermined length of the HARQ subpacket;
      a third approach of selecting L bits by taking the middle position of the mother code codeword as the center position to compose the HARQ subpacket, wherein it is selected that both sides of the center position have approximately equal bit numbers, and the L is a predetermined length of the HARQ subpacket;
      a fourth approach of selecting L bits by taking the last bit position of the mother code codeword as the center position to compose the HARQ subpacket, wherein it is selected that both sides of the center position have approximately equal bit numbers, and the L is a predetermined length of the HARQ subpacket;
      a fifth approach of selecting the first L bits from the mother code codeword by taking the position of the first bit of a first check bit stream as the start position to compose the HARQ subpacket, wherein the L is a predetermined length of the HARQ subpacket;
      a sixth approach of selecting the first L bits from the mother code codeword by taking the position obtained by adding the position of the first bit position of a first check bit stream and L/2 bit as the start position to compose the HARQ subpacket, wherein the L is a predetermined length of the HARQ subpacket;
      a seventh approach of selecting the first L bits by taking the middle position of the mother code codeword as the start position to compose the HARQ subpacket, wherein the L is a predetermined length of the HARQ subpacket;
      an eighth approach of selecting L bits by taking the middle position of the mother code codeword as the end position to compose the HARQ subpacket, wherein the L is a predetermined length of the HARQ subpacket;
      a ninth approach of selecting L bits by taking the middle position between the last bit of the mother code codeword and the first bit of a first check bit stream as the end position to compose the HARQ subpacket, wherein the L is a predetermined length of the HARQ subpacket; and
      a tenth approach of selecting L bits by taking the position of the last bit of an information bit stream of the mother code codeword as the end position to compose the HARQ subpacket, wherein the L is a predetermined length of the HARQ subpacket.

2. The method according to claim 1, wherein as for the third approach,
   L bits from $(N_{FB\_Buffer}/2-L/2)$ mod $(N_{FB\_Buffer})$ to $(N_{FB\_Buffer}/2+L/2-1)$ mod $(N_{FB\_Buffer})$ are sequentially read starting from the bit at the position of the $(N_{FB\_Buffer}/2-L/2)$ mod $(N_{FB\_Buffer})$ in the mother code codeword.

3. The method according to claim 1, wherein as for the fourth approach,
   L bits from $(N_{FB\_Buffer}-L/2)$ mod $(N_{FB\_Buffer})$ to $(N_{FB\_Buffer}+L/2-1)$ mod $(N_{FB\_Buffer})$ are sequentially read starting from the bit at the position of the $(N_{FB\_Buffer}-L/2)$ mod $(N_{FB\_Buffer})$ in the mother code codeword.

4. The method according to claim 1, wherein as for the fifth approach,
   L bits from the first bit of the first check bit stream to the bit at the position of (the first bit of the first check bit stream+L-1) mod $(N_{FB\_Buffer})$ are sequentially read starting from the first bit of the first check bit stream in the mother code codeword.

5. The method according to claim 1, wherein as for the sixth approach,
   L bits from (the first bit of the first check bit stream+$N_{FB\_Buffer}/2$) to (the first bit of the first check bit stream+$N_{FB\_Buffer}/2+L-1$) mod $(N_{FB\_Buffer})$ are sequentially read starting from the position obtained by adding the first bit position of the first check bit stream and $N_{FB\_Buffer}/2$ in the mother code codeword.

6. The method according to claim 1, wherein as for the seventh approach,
   L bits from $(N_{FB\_Buffer}/2)$ mod $(N_{FB\_Buffer})$ to $(N_{FB\_Buffer}/2+L-1)$ mod $(N_{FB\_Buffer})$ are sequentially read starting from the bit at the position of $(N_{FB\_Buffer}/2)$ mod $(N_{FB\_Buffer})$ in the mother code codeword.

7. The method according to claim 1, wherein as for the eighth approach,
   L bits from $(N_{FB\_Buffer}/2-L)$ mod $(N_{FB\_Buffer})$ to $(N_{FB\_Buffer}/2-1)$ mod $(N_{FB\_Buffer})$ are sequentially read starting from the bit at the position of $(N_{FB\_Buffer}/2-L)$ mod $(N_{FB\_Buffer})$ in the mother code codeword.

8. The method according to claim 1, wherein as for the ninth approach,
   L bits from (the first bit of the first check bit stream+$M*func((N_{FB\_Buffer}-$the first bit of the first check bit stream$)/(2*M))-L$) mod $(N_{FB\_Buffer})$ to (the first bit of the first check bit stream+$M*func((N_{FB\_Buffer}-$the first bit of the first check bit stream$)/(2*M))-1$) are sequentially read starting from the bit at the position of (the first bit of the first check bit stream+$M*func((N_{FB\_Buffer}-$the first bit of the first check bit stream$)/(2*M))-L$) mod $(N_{FB\_Buffer})$ in the mother code codeword, wherein the M represents a modulation mode of the current HARQ subpacket, the func(x) represents rounding upward, rounding downward or rounding off for x.

9. The method according to claim 1, wherein as for the tenth approach,

L bits from (the first bit of a first check bit stream−L) mod ($N_{FB\_Buffer}$) to (the first bit of the first check bit stream−1) are sequentially read starting from the bit at the position of the (the first bit of the first check bit stream−L) mod ($N_{FB\_Buffer}$) in the mother code codeword.

10. The method according to claim 1, wherein the step of coding and interleaving the information bit sequence to obtain the mother code codeword comprises:

coding the information bit sequence to obtain a system bit part and an uninterleaved check bit part, and taking the obtained system bit part as a system bit part of the mother code codeword;

performing intra-block interleaving on the uninterleaved check bit part to obtain the intra-block interleaved check bit part; and performing inter-block interleaving on the intra-block interleaved check bit part to obtain the inter-block interleaved check bit part, and taking the inter-block interleaved check bit part as a check bit part of the mother code codeword, wherein the mother code codeword comprises the system bit part and the check bit part;

or, coding the information bit sequence to obtain an uninterleaved system bit part and an uninterleaved check bit part;

performing intra-block interleaving on the uninterleaved system bit part and the uninterleaved check bit part, to obtain the intra-block interleaved system bit part and the intra-block interleaved check bit part, and taking the intra-block interleaved system bit part as a system bit part of the mother code codeword; and performing inter-block interleaving on the intra-block interleaved check bit part to obtain the inter-block interleaved check bit part, and taking the inter-block interleaved check bit part as a check bit part of the mother code codeword, wherein the mother code codeword comprises the system bit part and the check bit part.

11. The method according to claim 10, wherein when coding the information bit sequence, in the case that the code rate of an encoder for performing the coding is 1/r, the number of the obtained uninterleaved check bit part is r−1.

12. The method according to claim 10, wherein the mode for coding the information bit sequence comprises one of the following: Turbo code, tail-biting Turbo code, low density parity check code.

13. The method according to claim 1, wherein when selecting bits from the mother code codeword to composes the HARQ subpacket, the start bit of the mother code codeword is regarded as the next bit of the last bit of the mother code codeword.

14. A rate matching device, comprising:

an encoder, adapted to code the information bit sequence to generate a codeword with a length $N_{FB\_Buffer}$;

an interleaver, adapted to interleave the codeword generated by the encoder to obtain an interleaved mother code codeword;

a circular buffer, adapted to store the interleaved mother code codeword obtained by the interleaver; and a rate matcher, adapted to select bits from the mother code codeword to generate a HARQ subpacket for current transmission, wherein the rate matcher comprises one or more of the following:

a first rate matcher, adapted to select the first L bits starting from a start position in the mother code codeword to compose a HARQ subpacket when a value range of a HARQ subpacket identifier (SPID) of the HARQ subpacket retransmission is 0, 1, 2 or 3, wherein the L is a predetermined length of the HARQ subpacket;

a second rate matcher, adapted to select the last L bits from the mother code codeword to compose a HARQ subpacket when a value range of a SPID of the HARQ subpacket retransmission 0, 1, 2 or 3, wherein the L is a predetermined length of the HARQ subpacket;

a third rate matcher, adapted to select L bits by taking the middle position of the mother code codeword as the center position to compose a HARQ subpacket when a value range of a SPID of the HARQ subpacket retransmission is 0, 1, 2 or 3, wherein it is selected that both sides of the center position have approximately equal bit numbers, and the L is a predetermined length of the HARQ subpacket;

a fourth rate matcher, adapted to select L bits by taking the last bit position of the mother code codeword as the center position to compose a HARQ subpacket when a value range of a SPID of the HARQ subpacket retransmission is 0, 1, 2 or 3, wherein it is selected that both sides of the center position have approximately equal bit numbers, and the L is a predetermined length of the HARQ subpacket;

a fifth rate matcher, adapted to select the first L bits from the mother code codeword by taking the position of the first bit of a first check bit stream as the start position to compose a HARQ subpacket when a value range of a SPID of the HARQ subpacket retransmission is 0, 1, 2 or 3, wherein the L is a predetermined length of the HARQ subpacket;

a sixth rate matcher, adapted to select the first L bits from the mother code codeword by taking the position obtained by adding the first bit position of a first check bit stream and L/2 bit as the start position to compose a HARQ subpacket when a value range of a SPID of the HARQ subpacket retransmission is 0, 1, 2 or 3, wherein the L is a predetermined length of the HARQ subpacket;

a seventh rate matcher, adapted to select the first L bits by taking the middle position of the mother code codeword as the start position to compose a HARQ subpacket when a value range of a SPID of the HARQ subpacket retransmission is 0, 1, 2 or 3, wherein the L is a predetermined length of the HARQ subpacket;

an eighth rate matcher, adapted to select L bits by taking the middle position of the mother code codeword as the end position to compose a HARQ subpacket when a value range of a SPID of the HARQ subpacket retransmission is 0, 1, 2 or 3, wherein the L is a predetermined length of the HARQ subpacket;

a ninth rate matcher, adapted to select L bits by taking the middle position between the last bit of the mother code codeword and the first bit of a first check bit stream as the end position to compose a HARQ subpacket when a value range of a SPID of the HARQ subpacket retransmission is 0, 1, 2 or 3, wherein the L is a predetermined length of the HARQ subpacket; and a tenth rate matcher, adapted to select L bits by taking the position of the last bit of an information bit stream of the mother code codeword as the end position to compose a HARQ subpacket when a value range of a SPID of the HARQ subpacket retransmission is 0, 1, 2 or 3, wherein the L is a predetermined length of the HARQ subpacket.

15. The device according to claim 14, wherein the interleaver further comprises:
- an intra-block interleaver, adapted to intra-block interleave the codeword generated by the encoder, to obtain an intra-block interleaved check bit part, or further to obtain an intra-block interleaved system bit part; and
- an inter-block interleaver, adapted to inter-block interleave the intra-block interleaved check bit part obtained by the intra-block inverleaver to obtain an inter-block interleaved check bit part.

16. The device according to claim 15, wherein the circular buffer is further adapted to store the intra-block interleaved system bit part or the uninterleaved system bit part onto the start position of the circular buffer as a system bit part of the mother code codeword.

17. The device according to claim 15, wherein the circular buffer is further adapted to store the inter-block interleaved check bit part onto the position behind a system bit part in the circular buffer.

18. A rate matching device, comprising:
- an encoder, adapted to code the information bit sequence to generate a codeword with a length $N_{FB\_Buffer}$;
- a memory, adapted to store the codeword coded by the encoder and virtual circular buffer generated by an address generator;
- the address generator, adapted to generate corresponding address of each codeword bit of a HARQ subpacket for current transmission in the memory, interleave the codeword stored in the memory to generate the virtual circular buffer with the length $N_{FB\_Buffer}$, take the data of the virtual circular buffer as a mother code codeword, and continuously select from the mother code codeword the address corresponding to a codeword bit section for generating the HARQ subpacket; and
- a codeword bit reader, adapted to select codewords from the memory according to the address selected by the address generator to generate the HARQ subpacket for current transmission.

19. The device according to claim 18, wherein the address generator comprises one or more of the following:
- a first address generator, adapted to select the first L bits starting from a start position in the mother code codeword to compose a HARQ subpacket when a value range of a HARQ subpacket identifier (SPID) of the HARQ subpacket retransmission is 0, 1, 2 or 3, wherein the L is a predetermined length of the HARQ subpacket;
- a second address generator, adapted to select the last L bits from the mother code codeword to compose a HARQ subpacket when a value range of a SPID of the HARQ subpacket retransmission is 0, 1, 2 or 3, wherein the L is a predetermined length of the HARQ subpacket;
- a third address generator, adapted to select L bits by taking the middle position of the mother code codeword as the center position to compose a HARQ subpacket when a value range of a SPID of the HARQ subpacket retransmission is 0, 1, 2 or 3, wherein it is selected that both sides of the center position have approximately equal bit numbers, and the L is a predetermined length of the HARQ subpacket;
- a fourth address generator, adapted to select L bits by taking the last bit position of the mother code codeword as the center position to compose a HARQ subpacket when a value range of a SPID of the HARQ subpacket retransmission is 0, 1, 2 or 3, wherein it is selected that both sides of the center position have approximately equal bit numbers, and the L is a predetermined length of the HARQ subpacket;
- a fifth address generator, adapted to select the first L bits from the mother code codeword by taking the position of the first bit of a first check bit stream as the start position to compose a HARQ subpacket when a value range of a SPID of the HARQ subpacket retransmission is 0, 1, 2 or 3, wherein the L is a predetermined length of the HARQ subpacket;
- a sixth address generator, adapted to select the first L bits from the mother code codeword by taking the position obtained by adding the first bit position of a first check bit stream and L/2 bit as the start position to compose a HARQ subpacket when a value range of a SPID of the HARQ subpacket retransmission is 0, 1, 2 or 3, wherein the L is a predetermined length of the HARQ subpacket;
- a seventh address generator, adapted to select the first L bits by taking the middle position of the mother code codeword as the start position to compose a HARQ subpacket when a value range of a SPID of the HARQ subpacket retransmission is 0, 1, 2 or 3, wherein the L is a predetermined length of the HARQ subpacket;
- an eighth address generator, adapted to select L bits by taking the middle position of the mother code codeword as the end position to compose a HARQ subpacket when a value range of a SPID of the HARQ subpacket retransmission is 0, 1, 2 or 3, wherein the L is a predetermined length of the HARQ subpacket
- a ninth address generator, adapted to select L bits by taking the middle position between the last bit of the mother code codeword and the first bit of a first check bit stream as the end position to compose a HARQ subpacket when a value range of a SPID of the HARQ subpacket retransmission is 0, 1, 2 or 3, wherein the L is a predetermined length of the HARQ subpacket;
- a tenth address generator, adapted to select L bits by taking the position of the last bit of an information bit stream of the mother code codeword as the end position to compose a HARQ subpacket when a value range of a SPID of the HARQ subpacket retransmission is 0, 1, 2 or 3, wherein the L is a predetermined length of the HARQ subpacket.

* * * * *